US009549152B1

(12) United States Patent
Nayyar et al.

(10) Patent No.: US 9,549,152 B1
(45) Date of Patent: Jan. 17, 2017

(54) APPLICATION CONTENT DELIVERY TO MULTIPLE COMPUTING ENVIRONMENTS USING EXISTING VIDEO CONFERENCING SOLUTIONS

(71) Applicant: GOOGLE INC., Mountain View, CA (US)

(72) Inventors: Harsh Nayyar, Mountain View, CA (US); Rohan Relan, Atherton, CA (US); Chuo-Ling Chang, Mountain View, CA (US); Peter Kai Hua Tan, Campbell, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/734,646

(22) Filed: Jun. 9, 2015

Related U.S. Application Data

(60) Provisional application No. 62/009,715, filed on Jun. 9, 2014.

(51) Int. Cl.
*H04N 7/14* (2006.01)
*H04N 7/15* (2006.01)
*H04L 29/06* (2006.01)

(52) U.S. Cl.
CPC ............ *H04N 7/15* (2013.01); *H04L 65/403* (2013.01)

(58) Field of Classification Search
USPC ........................................ 348/14.014–14.09
See application file for complete search history.

(56) References Cited

U.S. PATENT DOCUMENTS

| 2005/0149988 A1* | 7/2005 | Grannan | H04N 7/088 348/E7.031 |
| 2007/0186002 A1* | 8/2007 | Campbell | H04N 7/142 709/231 |
| 2008/0086700 A1* | 4/2008 | Rodriguez | G06F 9/4443 715/804 |

(Continued)

OTHER PUBLICATIONS

Cisco, "Sharing a Screen, Documents or Whiteboard in Cisco Unified MeetingPlace", Application and Desktop Sharing Considerations for Large Meetings, Release 7, Dec. 9, 2009, 20 pages.

(Continued)

*Primary Examiner* — Maria El-Zoobi
(74) *Attorney, Agent, or Firm* — Brake Hughes Bellermann LLP

(57) ABSTRACT

Example implementations are related to establishing, by an application delivery system in response to an identification of an application from a client device, a video conferencing session between a first video conferencing endpoint provided on the application delivery system and a second video conferencing endpoint provided on a client device, selecting a video capture module as a video input device for the first video conferencing endpoint, receiving, by the video capture module provided on the application delivery system, display data output by the application, converting, by the video capture module, the display data to a plurality of video frames, streaming the plurality of video frames received via the video capture module from the first video conferencing endpoint to the second video conferencing endpoint via the video conferencing session; and receiving, by the application delivery system from the client device, a user input signal for the application.

25 Claims, 13 Drawing Sheets

(56) References Cited

U.S. PATENT DOCUMENTS

| | | | |
|---|---|---|---|
| 2010/0273553 A1* | 10/2010 | Zalewski | A63F 13/12 463/31 |
| 2011/0052144 A1* | 3/2011 | Abbas | G11B 27/034 386/240 |
| 2011/0196928 A1* | 8/2011 | Pryhuber | H04N 7/15 709/204 |
| 2012/0042060 A1* | 2/2012 | Jackowski | H04L 47/2475 709/224 |
| 2014/0195675 A1* | 7/2014 | Silver | H04L 65/1083 709/224 |
| 2014/0208235 A1* | 7/2014 | Robinson | G06F 3/0481 715/753 |
| 2015/0128014 A1* | 5/2015 | Monroe | G06F 3/0482 715/202 |
| 2015/0281107 A1* | 10/2015 | Dorcey | H04L 47/35 370/235 |

OTHER PUBLICATIONS

Sullivan, et al., "Active Collaboration Room, Transforming Business Models by Accelerating Distributed Team Performance", Cisco White Paper, May 2010, 18 pages.

Weinstein, "Real World Options for Multipoint Videoconferencing", Wainhouse Research Whitepaper, Apr. 2012, 11 pages.

* cited by examiner

APPLICATION CONTENT DELIVERY TO MULTIPLE COMPUTING ENVIRONMENTS USING EXISTING VIDEO CONFERENCING SOLUTIONS

RELATED APPLICATION

This application claims priority to U.S. Provisional application Ser. No. 62/009,715, filed on Jun. 9, 2014, and entitled "System and Method For Providing Interactive Application Delivery of Apps Across A Multiplicity of Mobile and Non-Mobile Computing Environments Using Existing Video Conferencing Solutions", incorporated herein by reference.

TECHNICAL FIELD

The various example implementations relate generally to providing a software system and method by which software applications built for one native application environment can be interactively delivered to and experienced on a multiplicity of application environments either native or non-native and specifically to that system and method that delivers the content of those applications through existing video conferencing solutions, negating the requirement for a special purpose player on the client-side.

BACKGROUND

Existing approaches for delivering interactive applications rely on special purpose players. Such special purpose players exist either as standalone players (an application solely for the purpose of handling an interactive application stream), or as a System Development Kit (SDK), which provides the interactive application streaming capabilities that is integrated into a larger application.

Example implementations described herein may negate the need of having any special purpose player applications on a client device. As such example implementations may remove all the user friction associated with finding an application on an app store, selecting it for download, entering usernames and passwords and downloading and installing the application itself. Also, the example implementations may negate the need to download special purpose players, by its ability to leverage existing video conferencing solutions to deliver interactive applications to a multiplicity of application environments using video conferencing clients, which are widely deployed to end-users. Examples of existing video conferencing solutions include Skype and such browsers as Chrome, Firefox, Opera and others that support WebRTC. Currently there are no other approaches that leverage these widely available and installed video conferencing solutions to deliver interactive application content. Current uses of video conferencing solutions are typically only for supporting video conferencing not for delivering interactive applications.

SUMMARY

According to an example implementation, a computer program product may include a non-transitory computer-readable storage medium and storing executable code that, when executed by at least one data processing apparatus, is configured to cause the at least one data processing apparatus to perform a method including: establishing, by an application delivery system in response to an identification of an application from a client device, a video conferencing session between a first video conferencing endpoint provided on the application delivery system and a second video conferencing endpoint provided on a client device; selecting a video capture module as a video input device for the first video conferencing endpoint; receiving, by the video capture module provided on the application delivery system, display data output by the application; converting, by the video capture module, the display data to a plurality of video frames; streaming the plurality of video frames received via the video capture module from the first video conferencing endpoint to the second video conferencing endpoint via the video conferencing session; and receiving, by the application delivery system from the client device, a user input signal for the application.

According to another example implementation, a computer-implemented method is provided for executing instructions stored on a non-transitory computer-readable storage medium, the method including: establishing, by an application delivery system in response to an identification of an application from a client device, a video conferencing session between a first video conferencing endpoint provided on the application delivery system and a second video conferencing endpoint provided on a client device; selecting a video capture module as a video input device for the first video conferencing endpoint; receiving, by the video capture module provided on the application delivery system, display data output by the application; converting, by the video capture module, the display data to a plurality of video frames; streaming the plurality of video frames received via the video capture module from the first video conferencing endpoint to the second video conferencing endpoint via the video conferencing session; and receiving, by the application delivery system from the client device, a user input signal for the application.

According to another example implementation, an apparatus is provided that includes at least one processor and at least one memory including computer instructions, when executed by the at least one processor, cause the apparatus to: establish, by an application delivery system in response to an identification of an application from a client device, a video conferencing session between a first video conferencing endpoint provided on the application delivery system and a second video conferencing endpoint provided on a client device; select a video capture module as a video input device for the first video conferencing endpoint; receive, by the video capture module provided on the application delivery system, display data output by the application; convert, by the video capture module, the display data to a plurality of video frames; stream the plurality of video frames received via the video capture module from the first video conferencing endpoint to the second video conferencing endpoint via the video conferencing session; and receive, by the application delivery system from the client device, a user input signal for the application.

Various other example implementations may be directed to a software system and method by which software applications built for one native application environment can be interactively delivered to and experienced on a multiplicity of application environments either native or non-native and specifically to a system and method that delivers the content of those applications through existing video conferencing solutions, negating the requirement for a special purpose video-audio player on the client-side.

In one example implementation of a generic video conferencing solution, there are two video conferencing endpoints each communicating two streams of information over a network with each other (1) audio and (2) video. A third channel for control is also used, either through a side channel if available in a specific embodiment of a video conferencing solution or implicitly through server processing of voice/gestures from the client's audio/video feed. Locally connected to each video conferencing endpoint there is an audio-visual display for presenting the other endpoints audio and video. There is also a webcam and microphone for capturing the video and audio of the participants at its endpoint of the videoconference and streaming it in real-time to the other endpoint over a network.

In another example implementation, a virtual video device (virtual webcam) and virtual audio device (virtual microphone) are presented or input to one endpoint of the video conferencing solution. This endpoint resides on a mobile Application delivery server. The source of the virtual video device is the display output of the interactive application. The source of the virtual audio device is the audio output of the interactive application. The control is transmitted either through a side channel available in the video conferencing solution (if available), or implicitly through gesture and/or voice recognition by processing the client's audio/video feed. At the other endpoint of the video conferencing solution the present invention works by interfacing a JavaScript-based player controller module via a browser exposed API to the video conferencing solution framework.

In one example implementation, Web Real-Time Communication (WebRTC) is used as the video conferencing solution. WebRTC is an API definition drafted by the World Wide Web Consortium (W3C) that supports browser-to-browser applications for voice calling, video chat and P2P file sharing without plugins (Wikipedia). WebRTC is an open protocol designed for low latency real time communication between web browser endpoints. WebRTC is currently implemented on the following web browsers: Google Chrome, Mozilla Firefox, and Opera.

At a high level, WebRTC exposes RTCPeerConnection. This is an abstraction of the connection established between endpoints communicating over the WebRTC protocol. The architecture allows browser makers or others to override the audio capture and video capture modules. Some example implementations may include overriding these modules on the server-side to integrate with the Application Environment audio and video output respectively on the server side.

In an example implementation that uses WebRTC as the video conferencing solution the video capture and audio capture modules are overwritten on the server-side by modules of the present invention on the mobile app delivery server. The source of the video capture module is the display output of the interactive application. The source of the audio capture is the audio output of the interactive application.

At the other endpoint of the video conferencing solution, the client-side browser, the present invention works by interfacing a JavaScript-based player controller module via a browser-exposed Web API to the WebRTC framework. The player controller module receives streamed video and audio from the WebRTC framework via the Web API and displays and plays the content for the user. The player controller module is also responsible for collecting user input and sends it to the server over the control channel.

In one example implementation, application streaming technology may be used to deliver interactive application content, including streaming of audio and video content between server and client using a WebRTC video conferencing solution.

The provisioner is modified to provide an additional parameter in its response, the WebRTC Signaling port.

The control server is modified to provide an additional interface (WebSocket) on which it listens for client connections. Previously, it only listened for connections on a raw TCP socket. The protocol remains identical. In this embodiment, we establish a side channel for control using a WebSocket. Alternatively, this side channel could be established using an RTCDataChannel.

Together, the video capture, audio capture, and WebRTC streamer modules may perform the same or similar function as the "video capture and streamer" and "audio capture and streamer" modules. In the WebRTC system architecture, example implementations may override the audio capture and video capture modules to inject the application audio/video output for streaming. The transport module of the WebRTC stack handles the audio and video streaming. Overriding may generally include replacing one input device with another input device. In an example implementation, overriding may include selecting a video capture module (e.g., virtual webcam) and an audio capture module (e.g., virtual microphone) by a video conferencing endpoint to allow video and audio content from the application to be streamed over a video conferencing session, instead of selecting audio and video content from a microphone and webcam for streaming. Thus, overriding may include the selection of audio capture module and video capture modules that receive content from the application, rather than selection of an audio microphone and video webcam.

WebRTC uses the ICE framework for finding candidates (a process to determine potential network interfaces and ports through which to establish a connection) and uses SDP (session description protocol) for describing media (audio/video) configuration information. However, WebRTC does not define a signaling mechanism for communicating this information between peers. A new module is designed to handle signaling WebRTC signaling server establishes a WebSocket and relays ICE candidates and SDP data between the WebRTC streamer and the client.

On the mobile device, the client may be a JavaScript component executed within a WebRTC capable browser (e.g., Chrome on Android). The WebRTC Web API is exposed by the browser for use by WebRTC applications.

In one example implementation, the functionality of the downloaded client components is provided instead by the browser resident WebRTC endpoint (and its subcomponents) and one JavaScript-based component named the player controller. The browser present, WebRTC endpoint provides sub components for the video decoder, the audio decoder and the player components that subsume the functionality provided by downloaded components with similar names in the original patent application. The JavaScript-based player controller component of the present invention is responsible for establishing a new session and attaching video and audio streams provided by the WebRTC endpoint using the WebRTC API for display and playback using an HTML5 video element. In this embodiment, the JavaScript player controller connects to the control server using a WebSocket rather than a raw TCP socket. The player controller also establishes a connection to the WebRTC Signaling Server through a WebSocket. The player controller uses the WebRTC signaling channel to exchange ICE Candidates and SDP messages between the WebRTC implementation on the browser with that on the mobile app delivery server.

In an example implementation, the WebRTC implementation itself, e.g., WebRTC endpoint in the browser handles both audio/video decoding and playback/rendering. The player controller establishes a WebRTC session using the WebRTC Web API. In order to establish the session, the player controller also gets and or sets the signaling information in order to establish the video conferencing/WebRTC session. The player controller also handles input (touch/keyboard) events and transmits them (using the control channel protocol) to the control server. Finally, the player controller controls the presentation of the stream (e.g., rendered size, orientation).

An example flow for delivering interactive content in this embodiment is as follows:
1. The player controller makes an HTTP GET request to retrieve the JSON configuration file.
2. The player controller makes an HTTPS POST request to the load balancer in order to start an instance of the selected application.
3. The load balancer proxies the request to the provisioner on an available mobile app delivery server, which responds with the following:
   Credentials (username/password)
   IP of the selected mobile app delivery server
   Port that the WebRTC signaling server is listening on
4. The player controller establishes a WebSocket connection to the control channel and follows the control channel protocol to authenticate, sends session parameters (e.g., resolution, bit-rate, fps, etc), and makes a session launch request.
5. The control server responds with a launch response indicating successful session launch.
6. The player controller establishes a connection to the WebRTC signaling server and exchanges ICE candidates and Session Description (offer/response) to establish the WebRTC session.
7. Audio and Video start streaming to the client.
8. The player controller is notified through a WebRTC Web API callback when the audio/video stream is ready to be presented, and the Player attaches the stream to an HTML5 video element.
9. The player controller handles user input and relays the input to the control server.
10. Either the control server informs the player controller that the session has concluded, or the player controller initiates a disconnect.

Example implementations may allow for a highly interactive and application delivery with advantages/benefits, such as, for example, one or more of the following benefits:
(1) content from software applications built for one native application environment can be interactively delivered to and experienced on a multiplicity of application environments either native or non-native;
(2) removes the need to download special purpose client programs to process video and audio stream decoding and display and playback;
(3) leverages widely available client-side browser video conferencing endpoint solutions, including but not limited to WebRTC endpoint solutions, to receive video and audio streams from the server, decode them and display and playback the video and audio streams.

These and other features, aspects and advantages will be more fully understood when considered with respect to the following detailed description, appended claims, and accompanying drawings.

DETAILED DESCRIPTION

I. System and Method for Providing Interactive Content

Embodiments of the present invention provide a system and method for delivering interactive content generated by software applications configured to run on a native application environment, to clients providing non-native application environments, over a data communications network. Such applications may be, for example, gaming applications, and the clients may be mobile phones. The non-native application environments provided by the client devices do not provide the same APIs for running software applications that are provided by the native application environments in which the software applications are intended to run. Although embodiments of the present invention are directed to providing the interactive content to non-native application environments over the data communications network, a person of skill in the art should recognize that the interactive content may also be provided to native platforms.

In general terms, when the client is a mobile device, the method for delivering the interactive content includes:
1. Selecting on the mobile device a server-resident application to be presented on the mobile device.
2. Customization of how the application will appear on the mobile device.

3. Initialization of control, video and audio channels to be used to deliver application content to the mobile device.
4. Selection of a server to run the application.
5. Startup of the application on the selected server.
6. Server-side screen capture and audio capture of the output of the selected application.
7. Server-side encoding and streaming of the captured video and audio to the client device during a streaming session.
8. Client-side decoding and display of the streamed video on the mobile device.
9. Client-side decoding and playing of the streamed audio on the client device.
10. Client-side input acceptance and encoding on the client device.
11. Client-side forwarding of input to the server-side non-native application.
12. Converting the input to a corresponding input catered to the particular application.
13. Continuous monitoring of the condition of the data communications network during the streaming session and dynamically adjusting the video streams for achieving a highly responsive and interactive experience for the user of the non-native application on the mobile device.

Figure 1:
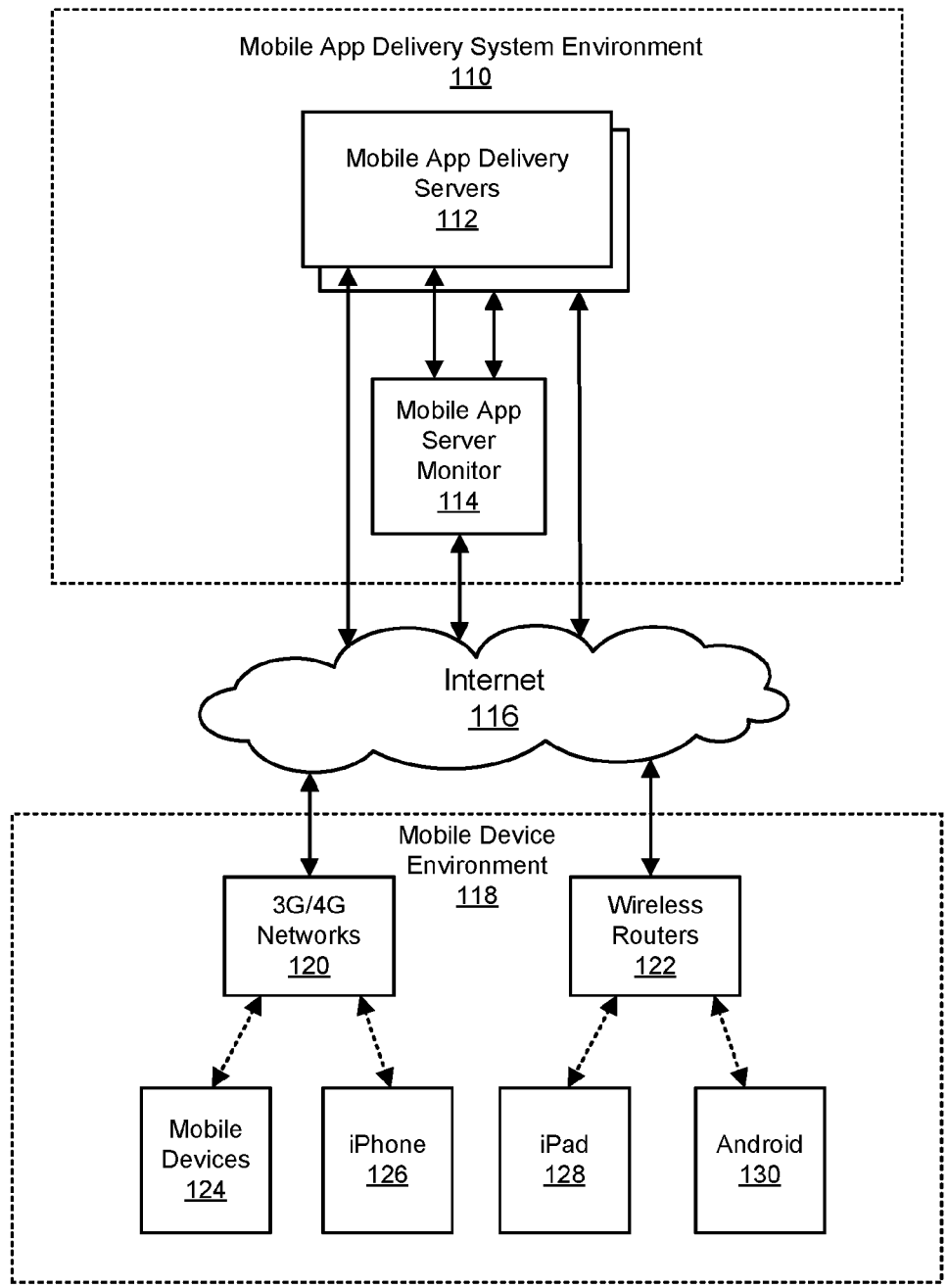
FIG. 1 is an overview block diagram of a system to deliver applications to non-native client platforms according to an example implementation.

FIG. 1 is an overview block diagram of a system for efficiently delivering interactive content to non-native client devices and platforms according to one embodiment of the present invention. The system in FIG. 1 includes a mobile application delivery system environment 110, a mobile device environment 118, and a data communications network 116 interconnecting the two environments. The data communications network 116 may be a local area network, private wide area network, or the public Internet, accessible via any wired or wireless technology conventional in the art. In one embodiment of the invention, the mobile application delivery system environment 110 is a cloud computing web server environment.

According to one embodiment of the invention, the mobile application delivery system environment 110 includes a set of delivery servers (also referred to as host devices) 112 and a monitoring server 114. According to one embodiment, each of the delivery servers host a software application on a native application environment. The native application environment provides, at a minimum, the same APIs as the APIs available on the original application environment for which the software application was specifically developed to run.

The monitoring server 114 takes requests to start a new application and selects a specific server from a pool of delivery servers 112 that host the application. According to one embodiment, the delivery servers 112 and/or monitoring server 114 are deployed and run in different geographic locations spread out from one another. In order to give the users a highly responsive interactive experience, the software components that reside in the client devices 124 send ICMP echo requests to a load balancer in a monitoring server 114 in a different geographic location, measure the roundtrip time, and choose the delivery server with lowest latency.

According to one embodiment of the invention, the mobile device environment 118 includes standard carrier 3G/4G networks 120, wireless routers 122, and various client devices 124-130 (collectively referenced as 124). The client devices may be mobile phones, electronic tablets, laptops, TV set top boxes, and the like. Although the environment 118 is described as a mobile environment, a person of skill in the art should recognize that the environment may include other environments, as such, for example, wired environments that include wired devices.

Each of the delivery servers 112, monitoring server 114, and client devices 124 includes a central processing unit (CPU) for executing software instructions and interacting with other system components for performing the functions described herein. The servers and client devices further include a mass storage device such as, for example, a hard disk drive or drive array, for storing various applications and data used for implementing the system. The server and client devices further include an addressable memory for storing software instructions to be executed by the CPU.

The server and client devices further include various input and output units conventional in the art. For example, each device may have an input unit such as, for example, a keyboard, keypad, joystick, microphone, and/or display screens with pressure sensitive (touch screen) technology. Each device may also have an output unit such as, for example, speakers, display screens, and the like. The server and client devices may further include wired or wireless data communication links for accessing the data communications network 116.

Figure 2:
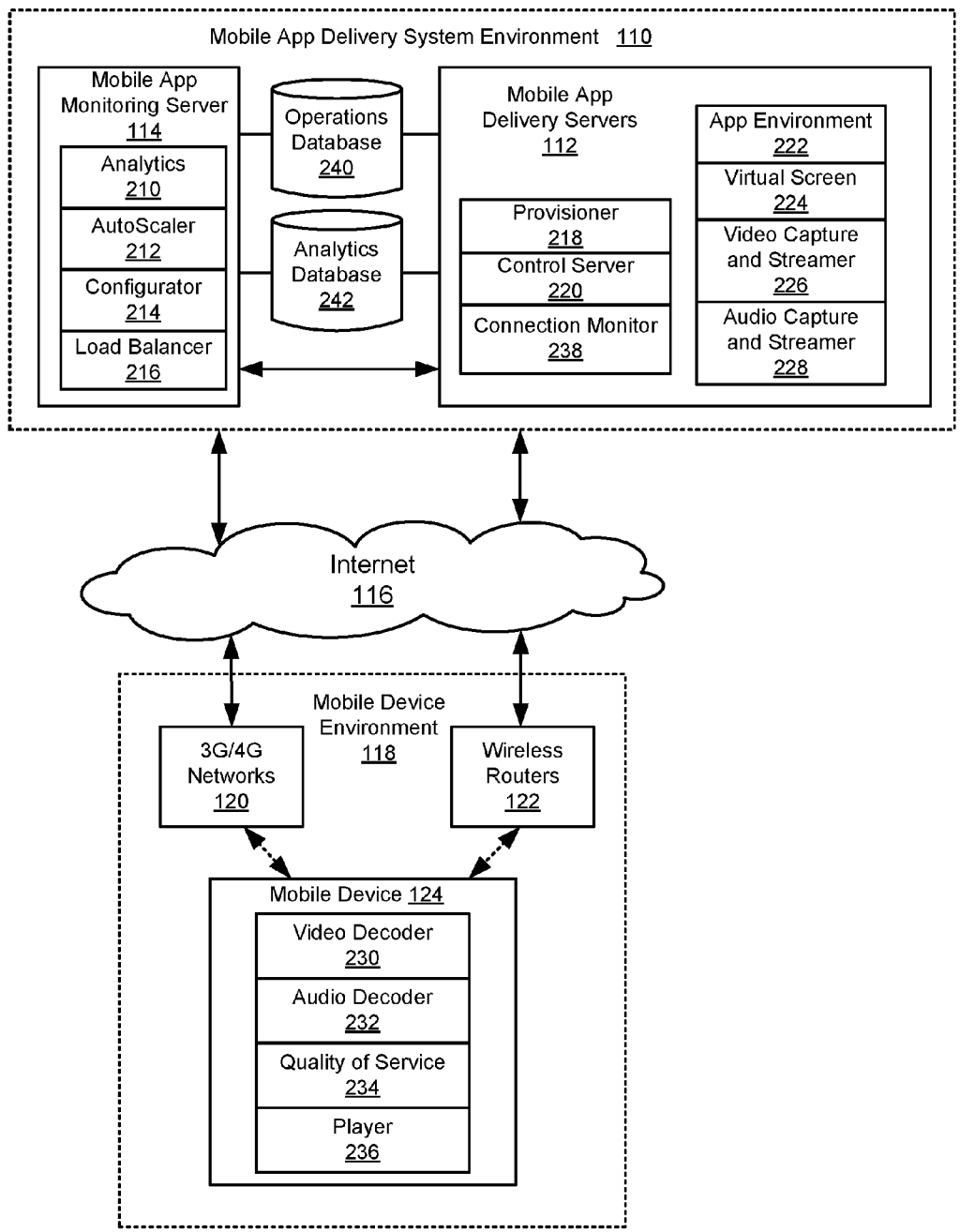
FIG. 2 is a more detailed block diagram of various modules hosted by various computing device of FIG. 1 according to an example implementation.

FIG. 2 is an overview block diagram of various modules hosted by the monitoring servers 114, delivery servers 112, and mobile devices 124 according to an example implementation. The various modules are implemented via computer program instructions which are stored in memory for executing by the CPU of the corresponding server. A person of skill in the art should recognize, however, that all or a portion of the various modules may be implemented via firmware, hardware, or a combination of software, firmware, and/or hardware.

According to one embodiment of the invention, the modules that reside in the monitoring servers 114 include, but are not limited to, a load balancer 216, a configurator 214 module, an autoscaler 212 module, and an analytics 210 module.

The load balancer 216 is configured to find a delivery server 112 that can support an incoming connection request to start an application. The load balancer is configured to select a machine and process instance for each new application request. Once the load balancer selects a machine instance, it also selects the instance of a control server, provisioner, and application environment modules that will be used for a particular instance of the application.

The load balancer 216 is configured to maximize the number of users on each delivery server 112. This allows more delivery servers 112 to become idle, i.e. without any active connections, so the autoscaler 212 can shut them down, potentially saving on cost.

According to one embodiment of the invention the load balancer 216 uses a connection monitor 238 on each delivery server 112 to find an available server. The connection monitor 238 may be implemented as a Ruby process that polls every second for a number of active connections on its delivery server 112. This includes polling for the number of active application environment processes, such as Firefox processes, Wine processes, or custom processes. The connection monitor 238 sends the collected data to an operations database 240. In one embodiment of the present invention, the operations database 240 is high performance database such as, for example, a Mongodb database, configured to handle a high amount of inserts/updates per second as well as quickly respond to queries. According to one embodiment, the connection monitor 238 sends its hostname, the number of open connections, and the number of available connections (the maximum available connections minus the open connections on a machine).

When a request comes in to the load balancer 216, it queries the operations database 240 to find a delivery server 112 that has connections available. Since there is a lag between when a client has been allocated to a particular delivery server 112, and when the client connects and the connections monitor 238 records the connection, the load balancer 216 cannot entirely trust the data coming from the operations database 240. For example, if a delivery server 112 is near capacity but has one connection available, and the load balancer 216 receives several requests in a short time frame, it may forward all requests to the same delivery server 112 before any client connects and increases the connection count.

In one example implementation, to mitigate the risk of this happening, two strategies are implemented. First, the load balancer 216 is configured to randomly select from a pool of candidate delivery servers 112 so requests do not always go to the same delivery server 112. Second, the load balancer 216 is configured to keep track of the last time it sent a request to a particular delivery server 112 so as to not send the same server multiple requests in a short time period. If there are no delivery servers 112 with available connections, the load balancer 216 is configured to try a preset number of times (e.g. three times) to find one before simply allocating the connection to a random server. This helps ensure that every user always receives a connection, even though his or her experience may be slightly degraded by the excess load on the server.

In one example implementation, the load balancer 216 is further configured to automatically remove problematic delivery servers 112 by checking the responses from the servers. If the response is an error, the server is queued for deletion. Similarly, if the response takes longer than a threshold time period or the delivery server 112 is unreachable, it is queued for deletion.

According to one example implementation, the autoscaler 212 is a module configured to manage the delivery servers 112 in order to accomplish various tasks. For example, the autoscaler may be configured to make sure enough delivery servers 112 are available to serve current users as well as users that may be connecting in the near future. The autoscaler may also be configured to delete unneeded delivery servers 112 so that there is not excess capacity, thus potentially reducing costs, such as, for example, in an embodiment that uses cloud servers.

In this regard, the autoscaler 212 regularly polls the operations database 240 and checks the number of available connections. If the number of available connections is too low, the autoscaler 212 starts enough delivery servers 112 to a configuration specified target number. If the number of available connections is too high, the autoscaler 212 queues the oldest delivery servers 112 for deletion until the number of available connections is equal to the required buffer size. Queuing the oldest servers for deletion helps reduce the number of errors in the system, as typically the oldest servers are prone to errors. A delivery server 112 that is queued for deletion is not immediately deleted as it may have users currently active. However, a server queued for deletion does not receive new connections. The autoscaler 212 regularly checks if any deleted delivery servers 112 are idle and deletes them when they are.

In one example implementation, the autoscaler 212 is implemented as a set of Ruby processes. The autoscaler 212 may also interact with the cloud providers, such as Blue Box Group and Amazon Web Services, for creating and deleting servers.

According to one embodiment of the invention, the analytics module 210 keeps statistics on system operations. Analytic data is stored in the analytics database 242. The analytics database 242 may be implemented as a high performance database such as, for example, a Mongodb database. The load balancer 216 stores information about user requests in the analytics database 242. The control server 220 updates records in the analytics database 242 when a user of a client device logs out so that total session time can be calculated. The analytics module 210 is designed to take analytic data offline for further processing. In addition, statistics pertaining to application requests and session distribution are available to be queried from the monitoring server 114.

According to one example implementation, the configurator 214 is a module configured to select and return a configuration file when a user selects a software application or game (collectively referred to as an application) on the client. The configuration files allow customization on the client on a per application basis for elements like mapping user gestures or taps to the original inputs of the application (e.g. mouse down, mouse click events, and the like). The configuration file also supports customization of "player skins" in order to customize the look and feel of the display on the client device.

According to one embodiment, configuration files store information on how the player 236 on the client device 124 should interact with the system, request video frame rate parameters, load content, and the like. There are two types of configuration files: player configuration files and application or game specific configuration files. The player 236 on the client device 124 consumes player configuration files. These files primarily have the URLs of services for retrieval by the player 236. For example a list of apps/games to show on the player 236; user ratings of apps/games, update purchase state in the case of a purchase or trial expiration, and the like. Some parameters may be used to distinguish between different client devices, such as, for example, between an electronic tablet and a mobile phone.

Application or game specific configuration files are used when a particular application or game is being started. This configuration file has all application or game specific information, like the URL to load, the product ID for payment, the screen dimensions it will run at, and parameters to distinguish between the various client devices (e.g. between iPad and an iPhone).

In one embodiment of the invention, configuration files are stored as JSON files. The configuration files allow the player 236 to be as general as possible, and thus allows changes to content or behavior on the fly via changes of the configuration files from the delivery server 112.

According to one example implementation, the provisioner 218 is a module on the delivery servers 112 which sets up a user's account on a particular delivery server. In one embodiment of the present invention, each unique user and its corresponding connection runs in its own Linux user account on the delivery server 112. This allows the sandboxing of users from each other. It also allows the creation of a secure system, as the user accounts have stripped permissions and are only allowed access to files and processes that are required for the selected application. The provisioner 218 creates the user account and adds the user to the required group.

In one example implementation, the user account set up by the provisioner 218 is determined based on the requested application. The skeleton directory has the files required for the particular application that is selected, for example the correct Mozilla file for a Flash application or the correct executable for a Wine application. The provisioner 218 also creates files in the user's directory to set parameters for the user. Such parameters may include, for example, the audio port to be used, Facebook credentials needed, and the like. The provisioner 218 is configured to set up some of the services the user may require. For instance, in one embodiment of the present invention, the provisioner 218 creates a pulseaudio sink for the user needed to stream audio to the client device.

According to one example implementation, the application environment 222 is a computer environment in which an application executes. The application environment 222 is specific to the type of application selected by the client device, and a computing platform (or virtualized computing platform based on a different underlying platform) of the delivery servers 112. According to one embodiment, an application environment includes, but is not limited to frameworks, libraries, APIs, and services for the runtime execution of programs developed for a particular computing platform. The application environment may also provide a virtualization layer to provide a different or isolated computing platform. For example, when the particular operating system provided by the computing platform of the delivery servers 112 is Linux, and the selected application is a browser-based application or a Flash-based application, the application environment 222 may be a Firefox browser or other similar browser configured to execute the Flash-based application. If the selected application is a Microsoft Windows application, the application environment 222 is Wine or other similar environment which allows computer programs written for Microsoft Windows to run on Unix-like operating systems. If the selected application requires a graphics processing unit (GPU), such as, for example, for high quality Windows games, the application environment 222 is vglrun. Vglrun executes the application with VirtualGL, which provides OpenGL to Xvnc. When native Unix or Java applications are selected, they are simply run as native applications and the application environment 222 is Unix or Linux.

When the application environment 222 is the Firefox browser, certain Firefox extensions are also used to provide additional functionality and interactivity for a user. For example, a Greasemonkey extension and scripts, and a custom extension, are configured to be used to achieve actions like scrolling, toggling the visibility of the keyboard, URL logging, and the like. The Greasemonkey extension is used to add or edit an HTML DOM that is loaded. The extension associates a script, written in JavaScript, to a URL, and the extension is triggered only for the associated URL. The URLs are filtered through regular expressions. The Greasemonkey scripts trigger after the associated HTML page has been loaded, which serves as an indication that the desired content is loaded, and signals the control server 220 to send a message to the client device 124 to remove the loading screen. The Greasemonkey scripts also attach event handlers to input elements on the HTML page that instruct the control server 220 to show or hide the keyboard. The Greasemonkey scripts are also used to weed out unwanted elements like advertisements and therefore only have the desired content appear on a virtual screen 224 for being streamed to the client devices 124-130.

According to one embodiment of the invention, the Greasemonkey scripts are served up for use remotely through a web service. There is one script present in the Greasemonkey extension that is triggered for an URL that is loaded. The Greasemonkey script then queries a web service passing in the current URL and the content type as parameters. The web service looks up a configuration file that in one embodiment of the present invention is encoded in JSON. The web server then serves the corresponding script back to the Greasemonkey script for it to execute. The configuration file has information of the URLs against which a particular script is to be triggered. The configuration file also has information of a list of excluded URLs and content types for which scripts are not to be triggered. All the URLs are filtered through regular expressions.

According to an example implementation, when the application environment 222 is the Firefox browser, a customized Redirector extension is also used. When the Firefox browser is launched and the customized extension is initialized, the Redirector extension creates a socket to hardcoded port on the control server 220. The customized extension performs actions such as page scrolling, page refreshing, stopping page loads, blocking URLs, and the like.

According to one example implementation, the customized extension is used to perform page commands forwarded from the client device 124. For example, when the player 236 on the client device 124, in response to a user action sends commands such as scroll page, refresh page, stop page, load URL, and the like, to the control server 220 on the delivery server 112, the control server 220 relays these commands to the customized extension. The customized extension in turn parses the commands and performs the appropriate action as a script on the Firefox browser. According to one embodiment, the customized extension can also be used to block URLs. The Firefox browser asks the customized extension if it should load a URL, and depending on the category of the URL, the request is served or cancelled. The list of blocked URLs comes from the configuration file of the content that has been currently loaded. The URL request is filtered through regular expressions. There are five categories of URLs:
1. White listed URLs: when such a URL is requested, the extension serves the }} request.
2. Black listed URLs: when such a URL is requested, the extension cancels the request.
3. Pop UP listed URLs: when such a URL is requested to load, the extension cancels the request and signals the client device 124, via the control server 220 and the player 236 on the client device, to show a message to the user informing them that the pop up was blocked.
4. Browser listed URLs: when such a URL is requested to load, the extension cancels the request and signals the client device 124, via the control server 220 and the player 236 on the client device, to show a message to the user to load the URL natively.
5. Ad URLs: when a URL does not match any of the above URLs, the extension cancels the request and signals the client device 124, via the control server 220 and the player 236 on the client device, to show the URL loaded in a web view inside of the player.

The customized extension for the Firefox browser application environment can also signal the client appropriately with a message to purchase an application after a trial period is over. When the customized extension is initialized, it queries a service for the payment information of the user for the content loaded. If the content is paid for, the user is given an uninterrupted browsing session. If the user has not yet paid for the content, he/she is considered a trial user. When the trial is over, the extension signals the client device 124, via the control server 220 and the player 236 on the mobile device, to display a message that the trial period is over and provide an option to buy the content. Any further requests are cancelled until the user purchases the content. Using a similar mechanism during the trial period, the user is presented, at periodic intervals, with messages in pop-up windows to make a purchase. In one embodiment of the invention, this payment setup is used for subscription payment systems.

In yet another example, if the native environment for the application that is hosted is Android, the application environment 222 module is a virtualization/emulation software and Android OS. The virtualization/emulation software provides an environment for the Android OS to run. To instrument the application, a custom launcher is used to control the launching of applications. A launcher is a main view of the OS and is responsible for starting other applications. The default launcher of Android is a home screen that a user usually sees. The custom launcher enables launching into the application directly when a client connects, and also prevents the application from exiting when user presses the back button. To achieve a seamless user experience, the data specific to mobile devices 124 are also captured in the mobile device and sent through the control channel to the control server 220. This data may include the device orientation, GPS location, gyro/accelerometer data, and the like.

According to one embodiment of the invention, the control server 220 is a module that authenticates a client based on input username and password. The control server 220 is also configured to receive input commands from the user via the player 236 on the mobile device 124 and forward these commands to the application environment 222 for the current application. The control server 220 is further configured to forward commands and messages from the application environment 222 to the player 236 on the client device 124 to control the look of the screen on the client device, such as for example, to display notifications that an application has launched, that a pop-up should be displayed, and the like.

In one embodiment of the present invention, authentication is done using PAM authentication. According to one embodiment, the provisioner 218 creates the usernames and passwords for each user. Once the control server 220 has authenticated the user, it knows what username to use for subsequent operations.

According to embodiment of the invention, once the control server 220 has authenticated the mobile client, it executes two processes. The first process is executed by the virtual screen 224 module. According to one embodiment, the virtual screen 224 module is an Xvnc session which provides a X11 display for the application the user wants to run. Xvnc is the Unix VNC (Virtual Network Computing) server, which is based on a standard X server. According to this embodiment, applications can display themselves on Xvnc as if it were a normal X display, but the applications are configured to actually appear on any connected VNC viewers rather than on a physical screen.

The control server 220 may also execute a bash script that sets any preferences needed for the application selected, such as Firefox preferences. The script starts the audio and video streamers, the window manager, and the application the user requested.

The second process or environment the control server 220 starts is the application environment 222 for the selected application. According to one embodiment of the invention, the control server 220 maintains a description of which specific application environments are used based on the type of application selected and the environment of the delivery server 112.

According to one example implementation, the video capture and streamer 226 module is a module that captures video frames output by the virtual screen 224 module. After the frames are captured, the video capture and streamer 226 module subsequently encodes and streams the video to the mobile device 124.

In one example implementation, the video capture and streamer 226 encodes in near real-time without a large buffer of frames and streams the encoded frames to the mobile device 124, where the video decoder 230 on the mobile device 124 decodes in near real-time, also without a large buffer of frames, thus achieving a highly responsive video display.

In one embodiment of the present invention, at start-up, the video streamer and capture 226 module connects to the control server 220. The control server 220 sends the video capture and streamer 226 module the parameters it should use, including frame rate, bit rate, and a video port to stream the video to the mobile device 124. The connection between the control server 220 and the video capture and streamer 226 is maintained throughout the lifetime of the connection from the client device 124, and can be used for quality of service adjustments of the video stream.

According to one example implementation, video capturing and encoding parameters are selected in a way that the system fully utilizes the network bandwidth designated to the video stream to produce high-quality video while keeping the encoding complexity sufficiently low to minimize the encoding time required for each frame, as part of the low-latency design. To further achieve minimal latency in the system so that applications are highly responsive to user input, the server encodes each video frame right after being captured, and the output from the encoder is immediately fed into the socket without excessive buffering or delay. On the client, the video decoder continuously parses the incoming video data from the socket. As soon as it collects all the data required to decode a video frame, the frame is decoded, resized if needed, converted to an appropriate color space, and displayed. Again, video data are decoded and displayed as soon as they are available and there is no excessive buffering to ensure minimal latency.

According to one example implementation, the video capture and streamer 226 module may include of a set of scripts (e.g., Python scripts) for capturing, encoding, and streaming video to the mobile device 124. According to one example implementation, the script launches one or more video processing programs (e.g. programs implemented using video processing libraries provided in FFMPEG) for the capturing, encoding, and streaming.

According to one example implementation, the video capture and streamer 226 module captures the display output by the virtual screen 224 module. For example, if using FFMPEG, the x11 grab function is invoked to capture the display from the Xvnc display. The video capture and streamer 226 then encodes (e.g. using FFMPEG together with x264) the video according to preset parameters. According to one embodiment, the various parameters are configured to provide low-latency operations to achieve real-time responsiveness to inputs provided by a user. The video capture and streamer 226 module captures the encoded output and streams the video to the mobile device 124. The video stream connection to the mobile device 124 is maintained for the lifetime of the mobile device 124 client connection. The mobile device 124 decodes the video using the video decoder 124 module, which in one embodiment of the invention, uses the H.264 decoder from the avcodec library in FFMPEG. The resulting frames are displayed by the player 236 module on the client device 124. The screen display may be done using a low-level API such as, for example, OpenGL ES (e.g. on iOS-based mobile devices), Surfaces (e.g., for Android-based mobile devices), and the like.

In one embodiment of the present invention, the video is encoded by the video capture and streamer 226 module on the delivery server 112 into a byte stream (e.g. an H.264 Annex B byte-stream using FFMPEG and ×264), and streamed to the client device 124 through a TCP socket. The video capturing and encoding is based on a video frame rate (in frames/sec or fps) and maximum video bit rate (in bits/sec or bps). The two parameters together determine a maximum frame size which identifies a maximum number of bits that the encoder can spend to encode a frame. The resulting visual quality of the frame is affected based on the maximum frame size that is selected.

On the client device, the video decoder 230 module parses the byte-stream into data units each corresponding to an encoded video frame and feeds them sequentially a decoder (e.g. H.264 decoder). However, because of how H.264 Annex B byte-streams are defined, the video decoder 230 module is able to recognize the completion of an encoded frame once the start of the next frame is observed. Therefore, a video frame cannot be correctly parsed and decoded until the next frame is received, resulting in an extra latency of the duration of one frame in the display of video content, significant for an interactive system. According to one embodiment, in order to address this latency, the video capture and streamer 226 module is configured to prefix a 4-byte field for each encoded video frame in the byte-stream, indicating the number of bytes included in the encoded frame. With this prefix, the video decoder 230 on the client device 124 can extract an encoded frame from the byte-stream as soon as it arrives and pass it to the decoder without having to wait for the next frame.

According to another example implementation, the video capture and streamer 226 module is configured to append a tag for marking the end of a video frame. For example, an AUD (Access unit Delimiter) defined in H.264 may be appended to the end of each encoded frame. Although AUD in H.264 is designed for marking the beginning of a video frame, it is inserted into the stream right after an encoded frame instead, without having to wait for the next frame to be captured or encoded. The decoder on the client detects the AUD immediately after receiving an encoded frame and starts decoding the frame without having to wait for the next frame.

In one example implementation, the video capture, encoding, and/or streaming parameters can be adjusted in real-time to allow for quality, latency, and/or bandwidth trade-offs, depending on the particular application or game. For example, in one embodiment of the invention, the lowest latency settings are used for Flash-based applications to provide better responsiveness at the expense of video quality. However, for certain Window's games, higher latency settings are used to avoid screen pixilation. These parameters are initially set in the configuration file for a particular application or game, and are configured to be modified in real-time. For example, parameters such as the video frame rate and/or maximum video bit rate may be adjusted in real-time while streaming a particular application or game, based on a monitored condition of the network.

More specifically, embodiments of the present invention provide two solutions to stream video from the delivery servers 112 to the client devices 124 with low latency so that applications provide real-time response to user input, while maintaining good visual quality: a first solution based on TCP (Transmission Control Protocol); and a second solution based on UDP (User Datagram Protocol). In both solutions, the virtual screen display on the server is periodically captured into video frames based on the frame rate specified in the system. The video frames are encoded and delivered from the video capture and streamer 226 on the server to the video decoder 230 on the client, via either a TCP or an UDP socket. Video capturing and encoding parameters are selected in a way that the system fully utilizes the network bandwidth designated to the video stream to produce high-quality video while keeping the encoding complexity sufficiently low to minimize the encoding time required for each frame, as part of the low-latency design. To further achieve minimal latency in the system, on the server each video frame is encoded right after being captured, and the output from the encoder is immediately fed into the socket without excessive buffering or delay. On the client, the video decoder continuously parses the incoming video data from the socket. As soon as it collects all the data required to decode a video frame, the frame is decoded, resized if needed and converted to an appropriate color space, and displayed. Again, video data are decoded and displayed as soon as they are available and there is no excessive buffering to ensure minimal latency.

TCP-Based Solution

According to one example implementation, the TCP-based solution uses a TCP socket to provide a reliable channel for video delivery. Potential transmission errors that may occur due to, for example, temporary glitches in the network or insufficient network bandwidth are all taken care of by the built-in error-detection and retransmission mechanism in TCP. Typical video streaming systems insert I-frames periodically in the video stream to enable random access and error recovery capability in the video decoder. However, for high-quality videos the I-frames are usually difficult to compress and therefore can take more time to transmit, resulting in a surge in latency. In the TCP-based solution, since error recovery is no longer needed at the decoder level and random access capability is not required in the interactive streaming application, except for the first frame in the video stream, I-frames are not used to avoid such a latency surge.

When transmission errors occur in the network, the TCP socket on the server side automatically slows down outgoing transmission, and the video traffic coming into the socket from the video streamer can be congested and buffered in the socket, increasing the video latency experienced on the client. To relieve such congestion, the amount of video traffic sent into the socket is quickly decreased so that the latency can be reduced back to a minimal level. In this regard, a QoS (Quality of Service) adaptation algorithm may dynamically adjust the video capturing and encoding parameters based on the network condition. According to one embodiment, the QoS adaptation algorithm not only downgrades video QoS, hence decreasing the amount of video traffic during bad network conditions to reduce latency, but also upgrades video QoS when additional network bandwidth is available to further improve the video quality. The QoS adaptation algorithm determines two QoS parameters used in video capturing and encoding: video: (1) frame rate (in frames/sec or fps); and (2) maximum video bitrate (in bits/sec or bps), denoted by fr and mbr respectively. The two parameters, fr and mbr, together determine the maximum frame size (mbr/fr), the max. number of bits that the video encoder can spend to encode a frame, which helps provide a good indication of the resulting visual quality of the frame. The operational range of the QoS parameters is defined by four system constants MIN_FR, MAX_FR, MIN_MBR and MAX_MBR such that MIN_FR<=fr<=MAX_FR and MIN_MBR<=mbr<=MAX_MBR. Another constant MBR_STEP (in bits/sec or bps) is specified in the algorithm to map the QoS parameters into a discrete set of QoS levels, together with two time intervals DOWNGRADE_INTERVAL and UPGRADE_INTERVAL that define how much time the algorithm has to wait before making a QoS adjustment. Table 1 is a pseudo code of the QoS algorithm for the TCP-based solution.

TABLE 1

```
define MAX_LEVEL as floor(MAX_MBR/MBR_STEP)
define MIN_LEVEL as ceil(MIN_MBR/MBR_STEP)
last_downgrade_time = 0
last_upgrade_time = 0
last_congestion_time = 0
for each level that MIN_LEVEL <= level <= MAX_LEVEL
    congestion_counter[level] = 0
end
current_level = min(max(MAX_FR, MIN_LEVEL), MAX_LEVEL)
for each video frame
    previous_level = current_level
    current_time = current system time
    if (socket is congested in the previous transmission)
        last_congestion_time = current_time
        congestion_counter[current_level] =
            congestion_counter[current_level] + 1
        if (current_level > MIN_LEVEL)
            if (current_time – last_downgrade_time >
                DOWNGRADE_INTERVAL)
                if (current_level > MIN_FR)
                    current_level = max(MIN_FR, MIN_LEVEL)
                else
                    current_level = MIN_LEVEL
                end
            end
        end
    else
        if (current_level < MAX_LEVEL)
            multiplier = pow(2, congestion_counter[current_level + 1])
            if (current_time – max(last_upgrade_time,
                last_congestion_time) >
                multiplier * UPGRADE_INTERVAL)
                current_level = current_level + 1
            end
        end
    end
    if (current_level < previous_level)
        last_downgrade_time = current_time
    else if (current_level > previous_level)
        last_upgrade_time = current_time
        for each level that MIN_LEVEL <= level <= previous_level
            congestion_counter[level] = 0
        end
    end
    mbr = current_level * MBR_STEP
    fr = min(max(current_level, MIN_FR), MAX_FR)
end
```

According to one example implementation, a congestion in the TCP socket is detected by testing if new data can be written into the socket within a certain timeout time (e.g., 20 msec), using, for example, a linux poll command. Upon congestion in the socket, the video capture and streamer 226 drops the video frame rate to a minimum value and correspondingly reduces the maximum video bit rate. In addition, when congestion occurs at a certain QoS level, the conges-tion count for that level is increased to record the congestion. If no congestion has occurred for a preset time since the last congestion or last QoS upgrade, indicating a good network condition, the algorithm gradually upgrades the QoS parameters. This interval increases, exponentially for example, with the congestion count at the destination QoS level, making it more difficult to upgrade to a level already shown to be congestion-prone. If the algorithm stays at a certain QoS level without a congestion long enough that it upgrades to the next level, the original level proves to be well supported by the network and the congestion counts of the level and all levels below it are reset to zero. According to one embodiment, when the value of the QoS level becomes smaller than MIN_FR, the video framerate fr stays at MIN_FR but the visual quality of each frame further degrades as indicated by the decrease in the max. frame size mbr/fr. Similarly, when the QoS level becomes larger than MAX_FR, fr stays at MAX_FR but quality of each frame is further improved.

In general, a video encoder does not always produce video traffic at the specified maximum bit rate. The video traffic generated can be far below mbr when the video content is rather static, and only approaches mbr during fast-moving scenes. This leads to an issue that congestion may never occur in a static scene, and the QoS adaptation algorithm keeps upgrading the QoS level multiple times although the upgraded mbr is already well above the bandwidth supported by the network. Significant congestion, hence high latency, can then be set off by a sudden scene change in the video content that generates traffic approaching the highly overvalued mbr. According to one embodiment, to resolve this issue, during a certain time interval right after a QoS upgrade, the video encoder is modified to append dummy data that is ignored in the decoder at the end of each encoded frame so that the frame size reaches the maximum frame size mbr/fr. This modification helps ensure that the video traffic temporarily reaches the specified mbr right after each QoS upgrade. If this bitrate is already more than the network can support, a minor congestion with less impact on latency is triggered followed by a timely QoS downgrade.

UDP-Based Solution

According to one embodiment, a retransmission mechanism in the TCP-based solution helps guarantee that all the data fed into the socket by the video streamer eventually arrive at the video decoder. However, during a bad network condition, the additional time required for retransmission and the potential congestion in the socket can have an adverse impact on the video latency. Although the QoS adaptation algorithm is configured to quickly relieve the congestion, the transient latency increase usually manifests in the form of a momentary pause in the video, which is undesirable in some applications. The UDP-based solution tackles the problem differently. The UDP-based solution does not attempt any retransmission. Data is not buffered in the socket and does not get discarded if not delivered in time. Therefore, video latency is less influenced by the network condition and stays rather constant, at the expense of potential transmission errors at the decoder level. In terms of user experience, the UDP-based solution differs from the TCP-based solution in that instead of potentially introducing momentary video pauses, occasional decoding errors may become noticeable.

The UDP-based solution uses RTP (Real-time Transport Protocol) to deliver the video stream from the server to the client over a UDP socket. RTP handles reordering of the UDP packets and detects if any packet gets lost in the transmission. Without retransmission, a lost packet can lead to decoding errors visible in the decoded frame that cannot be fully removed by error concealment techniques in the decoder. These visible decoding errors can also propagate across multiple frames because of the inter-frame dependency in the video stream. To stop such propagation, whenever a lost packet is detected a request for an intra-refresh cycle is sent from the client to the server through the control channel. Instead of using I-frames that can create a surge in latency, intra refresh is a technique in video coding that evenly distributes intra blocks that can be decoded independently from previous frames over multiple frames to stop error propagation while minimizing the increase in video traffic.

In a typical network setup, UDP packets get lost occasionally even when the available network bandwidth is sufficient for the video traffic. However, when packet losses occur frequently, an assumption is made that the current network bandwidth can no longer support the video traffic, and the video QoS level is downgraded. In this regard, a QoS adaptation algorithm similar to the one for the TCP-based solution is used for UDP with two main differences. First, the algorithm for UDP runs on the client instead of on the server. The QoS level determined on the client is then signaled to the server through the control channel to adjust the parameters in video capturing and encoding. Second, the algorithm detects if the frequency of UDP packet losses exceeds a threshold, rather than testing for congestion in the TCP socket, to decide if a QoS downgrade is needed or if an upgrade can be performed.

According to one example implementation, the audio capture and streamer 228 module is a module that captures audio produced by the application. After the audio is captured the audio capture and streamer 228 module subsequently encodes and streams audio to the client device 124.

In one example implementation, audio is captured by the audio capture and streamer 228 module using pulseaudio. Each application has a pulse sink created for it by the provisioner 218. When the application is launched, the pulse sink for the application is set to the one created by the provisioner 218. This ensures that all audio from the application goes to the pulse sink for the user requesting the application. For non pulse-aware applications, a wrapper script, such as padsp, is used to provide an OSS to pulseaudio bridge.

In one example implementation, to capture the audio, parec is used with the source set to be the sink's monitor. The output from parec is passed into an audio encoder.

In one example implementation, the audio encoder can be either CELT, MP3 or the audio can be sent uncompressed. The setting used is determined by what the client supports.

In one example implementation, the output from the audio encoder is passed to the UDP audio streamer. Upon receiving the audio stream, the client device 124, using the audio decoder 232 module decodes the audio. In one embodiment of the invention the audio decoder 232 uses the CELT library. In another example implementation, the audio decoder 232 uses the native iPhone MP3 decoding. The audio decoder 232 in the client device 124 uses a ring buffer to ensure too much audio data doesn't buffer up and create latency. It also uses Audio Queue Service for low latency operation.

In one example implementation, the audio capture and streamer 228, uses Python scripts to monitor all audio processes on the delivery server 112. If any process dies, all the audio processes are restarted and the user only experiences a brief and sometimes unnoticeable audio interruption.

According to one example implementation, the player 236 is a module that plays on the client device 124, the application that was selected by the user and which is executed on the delivery servers 112. According to one embodiment, the player allows a user of the client device to play content provided by a software application that is not originally intended to run in the application environment provided by the client device. For example, the client device does not provide the necessary APIs provided by the native application environment of the software application. The client device can thus be described as providing a non-native application environment with respect to the software application. In this regard, the software application is run on the delivery server 112, and the player 236 displays video and plays audio output of the application that is streamed from the delivery server to the client device 124. The player 236 also accepts input from the user, maps the input to a predefined command, encodes the command using a binary protocol, and sends the encoded command over the control channel to the delivery server 112. The mapping of the user input to predefined commands is based on a configuration file and/or modified based on the content currently displayed.

The player 236 communicates with the server side modules using a control channel. According to one example implementation, all communication between the client and server, which the exception of streamed video and audio, occurs over the control channel. Separate video and audio ports on the server are used to stream the video and audio.

According to one example implementation, the video decoder 230 decodes video streamed from the server. In one embodiment of the invention, the video decoder 230 uses the H.264 decoder from the avcodec library in FFMPEG.

According to one example implementation, the video decoder 230 decodes the incoming video stream into video frames in a YUV420 format. To playback the video frames with a desired color representation and dimension, the video decoder converts the video frames back to a RGB color space and resizes the video frames before being displayed on the screen. According to one embodiment, the color-space conversion and resizing is performed using programming shaders running on a graphics processing unit (GPU) through graphics APIs (e.g., OpenGL) that are generally available on clients such as iOS or Android devices. Color-space conversion and resizing using GPUs rather than CPUs significantly reduces the processing time due generally to the parallel processing architecture of GPUs especially suitable for such tasks, resulting in a reduced latency in the system as well as a higher frame rate that can be supported on the client.

According to one example implementation, the player 236 is independent of and not specific to any particular application content that it will present on the client device 124. Only one version of the player 236 is needed for a particular client device 124, regardless of how many different applications or application types it presents on the client device.

According to one example implementation, all communications between the player 236 on the client device 124 and the control server 220 on the delivery server 112 happens over the control channel. The player 236 takes input in the form of touches or on-screen keyboard selections. The input may also be provided via other input devices such as, for example, physical keypads, joysticks, and the like. The input is mapped to preset command and sent from the player 236 over the control channel to the control server 220. The control server 220 converts the received command into a command applicable for the application (e.g. mouse-down command, mouse-up command, or keyboard command) using a simulation tool such as, for example, libxdotool. Thus, the control server is configured to translate an input provided using a particular input device, to a second input that is generally provided using a different input device.

According to one example implementation, the player 236 may also send commands in response to user gestures. For example, a swipe down gesture is mapped to a scroll down command for a browser session. The mapping of the gesture to a particular command is based on the configuration file provided to the player for the particular application or game that is being played. The scroll down command is sent by the player 236 as a scroll down command over the control channel to the control server 220. The control server 220 forwards the scroll down command over a socket connection to the application environment 222. The application environment may run specific scripts to execute the particular command. For example, for Flash applications, a Greasemonkey script in the application environment 222 executes an input command using Javascript.

According to one example implementation, the player 236 and the control server 220, using custom commands communicated over the control channel, can coordinate the velocity of the user's scrolling on the client device 124 and the resulting scrolling of the video screen. For example, in one embodiment of the invention, the player 236 interprets the velocity of the user's finger movement into a scroll command of x pixels. The player 236 sends a custom command for a scroll of x pixels via the control channel to the control server 220, which in turn provides the command to the application environment 222. The application scrolls its screen by x pixels and outputs the updated screen for capture and streaming to the client device 124. The video decoder 230 decodes the updated video frames and the player 236 displays a screen where its contents have moved x pixels in response to the user's scrolling gesture. The rapid fine-grain scrolling on the client device and other user input which are communicated to the server causes the returned video and audio streams to reflect the user's scrolling and other action as if playing the application on its native device. This coordination of user input gestures on the client device 124, with reaction of the application on the delivery server 112, provides a highly interactive and responsive experience for the user.

According to one example implementation, the control channel on the client exposes many different types of actions which map to the different types of content. These are encoded using a binary protocol and sent to the server. The server executes these actions differently based on the type of content currently active. Below are a few examples:

1) Control channel exposes: sendMouseDown(button, x-position, y-position)
    Encoding: 2 byte integer indicating the message size (5 bytes), 1 byte indicating the button, 2 bytes for x position, 2 bytes for position
    Executed: via a library that talks to the X11 protocol called xdotool
2) Control channel exposes: sendOrientationChanged(orientation)
    Encoding: 2 byte integer indicating the message size (1 byte), 1 byte indicating the 4 possible orientation
    Executed: via a TCP socket connected to the simulator that tells it to change orientation
3) Control channel exposes: sendTouches(action, active_touch_id, number_touches, touch_id1, x-position1, y-position1, . . . )
    Encoding: 2 byte integer indicating the message size (3+5*number_touches bytes), 1 byte indicating the type of action (touch down/move/up), 1 byte indicating the active touch ID that triggered this event, 1 byte the number of touches, followed by the information of each individual touch [touch_id (1 byte), x-position (2 byte), y-position (2 byte)].
    Executed: via a TCP socket connected to the simulator that tells it the current touch event and all the touch data On the client, each of these commands can be executed by different types of input. For example, sendMouseDown can be called when the "tap" gesture is recognized if the current server-side content is flash. However, if the current server-side content is an Android game, the sendTouches command can be executed in response to the "tap" gesture as this makes more sense.

According to one example implementation, instead of mapping a user input to a specific command catered for the application at the client side, the raw input data is provided to the client and the server converts the raw input data to an input that is appropriate based on the application environment and/or context of the application. For example, if the server-side application environment is Firefox and the content inside is a web page, a touch down immediately followed by a series of touch moves and touch up (a swipe/drag action) on the client mobile device implies the user wants to scroll the page. However, if the control server is not aware that the content is a web page, the server sends a mouse down followed by mouse moves and a mouse up, which is a selection action in Firefox. In order to interpret a swipe/drag action (touch down→move→up) as a scroll command on the server side, embodiments of the present invention use a Firefox extension to capture all the mouse events and interpret them as certain gestures appropriately.

According to one example implementation, the audio decoder 232 module decodes the audio streamed from the server. In one embodiment of the invention the audio decoder 232 will use the native audio decoder of the mobile platform. In another embodiment of the invention the audio decoder 232 will use the CELT decoder library. The CELT codec is a low latency compression-decompression algorithm for audio.

In one example implementation, the player 236 and the other modules the player 236 uses on the client device 124, including the video decoder 230 and audio decoder 232, are packaged as a native application for a particular client device. For example, there is a player application written specifically for iOS devices, such as iPhone 126 or iPad 128 mobile devices, and another player application written specifically for Android 130 mobile devices.

Figure 3A:
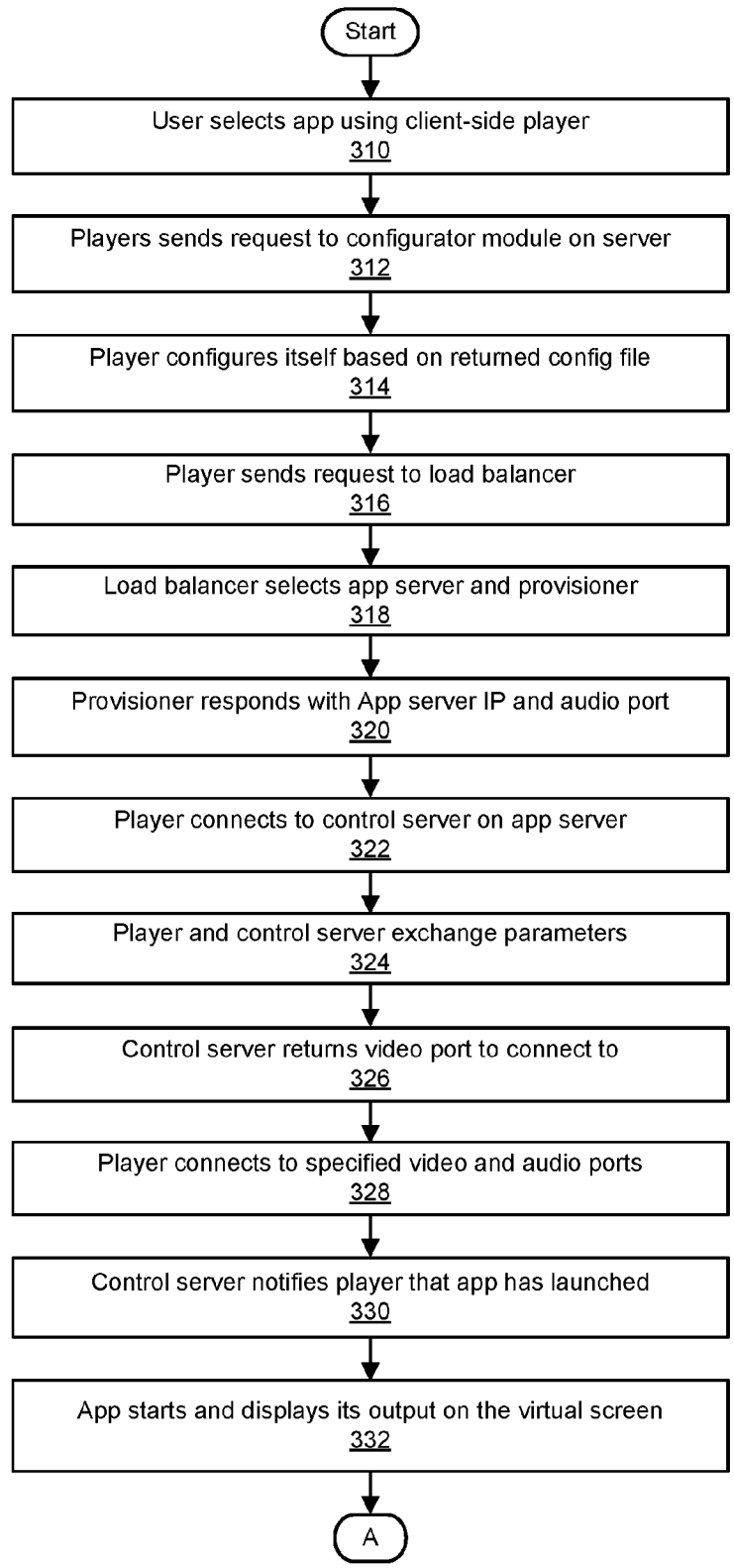
FIGS. 3A-3B are flow diagrams of a process for providing interactive content generated by an application configured to run in one application environment, to a client device providing a different application environment, according to an example implementation.
Figure 3B:
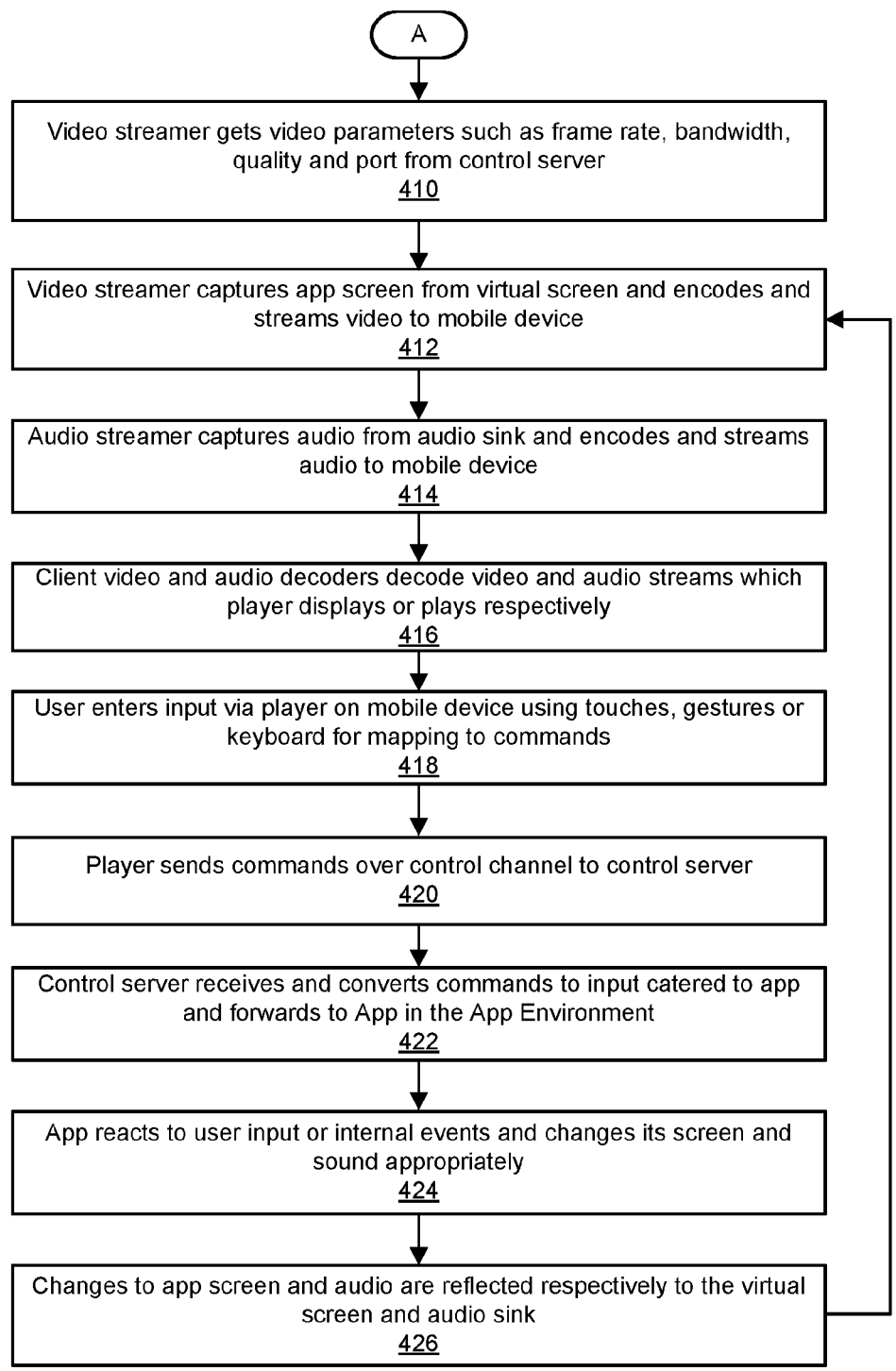

FIGS. 3A-3B are flow diagrams of a process for providing interactive content generated by an application configured to run in one application environment, to a client device providing a different application environment, according to one example implementation.

The process starts, and the monitoring server 114 receives from the client device 124 identification of the particular software application to be invoked. In this regard, the monitoring server 114 receives a user selection of the particular application in step 310.

In step 312, the player 236 on the client device 124 sends a request for the selected application to the configurator 214 on the monitoring server 114.

In step 314 the configurator 214 returns the appropriate configuration file for the selected application back to the player 236, and the player 236 configures itself based on the parameters of the returned configuration file. For example, the player sets its display resolution, maximum bit rate, maximum frame rate, audio and video codec used, and the like.

In step 316, the player 236 sends a request to the load balancer 216 on the monitoring server 114 to start an instance of the selected application.

In step 318, the load balancer identifies and selects a specific delivery server 112 and an instance of the provisioner 218 on the same delivery server. According to one embodiment, the load balancer may select a delivery server which is geographically close to the client device.

In step 320 the provisioner 218 responds to the load balancer 216, who responds to the player 236, with parameters that include credentials for accessing the created instance of the delivery server 112, an IP address of the delivery server, and an audio port on the delivery server, to which the player should connect.

In step 322, the player 236 uses the parameters returned in step 320 to connect on the control channel to the instance of the control server 220 selected for the instance of the application.

In step 324 the control server 220 and the player 236 exchange over the control channel, parameters (e.g. username and password) for the instance of the application, frame rate, bit rate, supported video and audio codec, and the like.

In step 326 the control server 220 responds to the player 236 over the control channel with the video port on the delivery server 112 in which the player should connect.

In step 328 the player 236 connects to the video port specified by the control server 220 and the audio port specified by the provisioner 218.

In step 330 the control server 220 invokes the application in the application environment provided by the delivery server 112 and notifies the player 236 that the selected application has finished launching.

In step 332 the selected application generates screen display outputs and provides the outputs on the virtual screen 224 on the delivery server 112.

In step 410 the video capture and streamer 226 receives video parameters, such as, for example, frame rate, bandwidth, bit rate, and video port, from the control server 220.

In step 412 the video capture and streamer 226 captures and encodes a screen display output by the virtual screen 224 into various video frames according to the received frame rate. According to one embodiment, in order to achieve minimal latency in the system, each video frame is encoded after being captured, and the output from the encoder is fed to the video port without excessive buffering or delay. According to one embodiment, the maximum frame size of each video frame is based on the specified frame rate and the maximum bit rate.

In step 414 the audio capture and streamer captures audio from the audio sink of the selected application and then encodes and streams the audio to the client device 124 over the audio port.

In step 416 the video decoder 230 and audio decoder on the client device 124 respectively decodes the received video stream and audio stream, which the player 236 then displays or plays respectively on the client device. In this regard, the video decoder continuously parses the incoming video data from the socket. As soon as it collects all the data required to decode a video frame, the frame is decoded, resized if needed, converted to an appropriate color space, and displayed. Again, video data are decoded and displayed as soon as they are available and there is no excessive buffering to ensure minimal latency. According to one embodiment, the video decoder starts the decoding as soon as it identifies a tag (e.g. an AUD tag) which is inserted at the end of a particular video frame.

In step 418, the user enters input to the selected application via the player 236 using touches, gestures, keyboard entry, or any other form of input. According to one embodiment, the player 236 maps the user input (e.g. downward swipe, shaking of the device, changing orientation of the device, tapping on the screen, and the like) to a particular command defined in the configuration file for the application provided to the client device. For example, changing the orientation of the device may be mapped to a "sendOrientationChanged" command which receives, as a parameter, the orientation of the device. The change of orientation of the device and other inputs to the device are interpreted according to conventional mechanisms that will be understood by a person of skill in the art.

In step 420, the player 236 sends the mapped command(s) over the control channel to the control server 220.

In step 422 the control server converts the commands received from the player 236 to a corresponding input catered to the particular application (e.g. mouse or keyboard command understood by the application), and forwards the converted input commands to the application in the application environment 222.

In step 424, the selected application reacts to the user input or internal events, and changes its screen and sound output appropriately. In step 426 the changes to the screen are reflected onto the virtual screen 224 and the changes to the sound to the audio sink. The sequence then goes to step 412, and the streaming of video and audio to the client device continues.

In one example implementation, instead of mapping the user input to predefined high-level gestures or commands, such as sending a scroll down command when the user swipes down on the screen, the simplest mapping of the input or even the raw touch/input data from the client device is sent to the delivery server 112 over the control channel. For example, a mouse down event is sent when a user touches down on the screen. This mapping of input to the simplest command expected by the application environment on the server side avoids mapping to more complicated actions, such as high-level gestures or commands. The raw user inputs are then interpreted differently based on the content inside the application environment 222 and/or the context of the application. For example, a Firefox application provides a different context, which is browser based, than an Android application, which is touch-based. Thus, a mouse-down event may be transmitted to a Firefox application when a same action by a user would create the transmitting of a touch down event for an Android application. With respect to the transmitting of input based on content, instead of interpreting what the user wants to do (via, for example, gesture recognizers) on the client device, and sending it to the application on the server side, according to one embodiment of the invention, such gestures and/or user intentions are interpreted on the server side. For example, a touch down immediately followed by a series of touch moves and a touch up (i.e. a swipe/drag action) on the mobile device would imply that the user wants to scroll the page. If the control server makes a minimal interpretation based on the context of the application and transmits a mouse down input followed by mouse moves and mouse up inputs to, for example, a Firefox application, the application may interpret the input as a selection action instead of a scroll. Thus, for certain applications, the server is configured to capture all the mouse events and interpret them as a gesture prior to transmitting the input to the application. For a Firefox application environment, for example, whether interpreting a touch down event followed by a series of touch move events and a touch up event, as a scroll command, depends on the move direction. In the embodiment of the invention for Flash apps, such interpretation as a scroll command is disabled when the mouse down happens inside the Flash object, where the Flash object itself would interpret these mouse down/move/up events. Thus, for a Flash object, the inputs are not changed, and the minimally interpreted input (e.g. mouse down→move→up) is sent to the Flash object for interpreting the command on its own.

Interpreting the touch events on the delivery server 112 has the advantage of achieving content-aware gesture mapping. The application environment 222 knows exactly where the user touches and thus where the gesture starts and ends. Therefore the gesture can be better mapped creating a better user experience. In addition, sending the raw touch data improves responsiveness of the application because the raw input data is provided as the inputs are being entered instead of waiting for the entire input to complete. For example, there is no need for a swipe down event to complete before transmitting such an event to the application.

In one example implementation, the control channel is configured to transmit multiple touch inputs for application environments 222 that accept and expect such events (e.g. an Android application running in the delivery server 112). In this case, a touch tracker in the player 236 tracks the multiple touches. Each touch at the client side is assigned with a touch ID. According to one embodiment, each finger is represented with a touchID having associated coordinates (x, y). Each time the user starts or ends a touch event (e.g. putting one more finger down or lifting one finger up), the touch tracker in the player 236 groups all the touches along with the action (down/move/up) and the active touch ID that corresponds to the finger that initiated the event. This data is then sent through the control channel and to the control server 220. The control server 220 organizes the touch data into the format accepted by the application environment 222, and sends the formatted data to the application environment 222.

Figure 4:
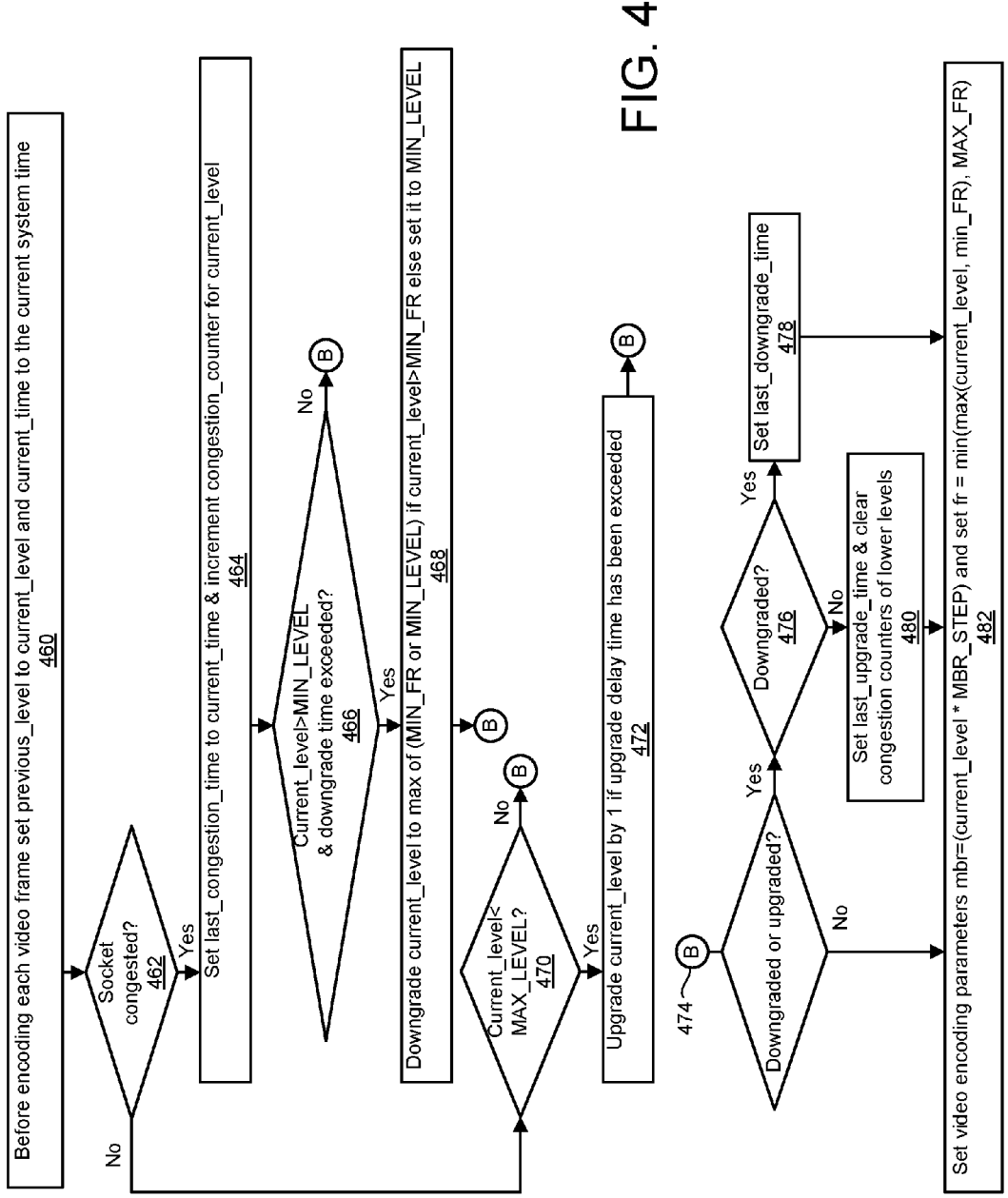
FIG. 4 is a flow diagram of a quality of service adaptation algorithm according to an example implementation.

FIG. 4 is a flow diagram of a process for dynamically adjusting the quality of streamed video frames during a streamed video session based on network congestion over a TCP socket, according to one example implementation. The process implements the QoS algorithm of table I. According to one embodiment, the process is implemented by the video capture and streamer module 226 on the mobile app delivery server 112.

In one example implementation, video quality may be either dynamically downgraded or upgraded based on the concurrent congestion status of a TCP socket. In this regard, the process adjusts video quality by varying two aspects of video quality: video frame rate and video bit rate. For example, the video frame rate can range from 10 to 24 frames per second (fps), and the video bit rate can range from 320K to 2048K bits per second (bps). Video frame rate affects primarily the smoothness or choppiness of a video. For a given video frame rate, the video bit rate affects primarily the visual quality of individual frames.

In one example implementation, as congestion over a TCP socket occurs, both the video frame rate and video bit rate are downgraded together until the video bit rate hits a predefined floor value MIN_FR, after which the video frame rate is held constant but the video bit rate continues to be downgraded.

According to one example implementation, the process of FIG. 4 may be invoked before the encoding of each and every frame of video to be transmitted to the client device. However at the initialization of the video streaming session, certain constant values are set that control the range and frequency of the adjustment of video quality. In one embodiment of the invention, the following constants are used:
MIN_LEVEL=minimum QoS level (e.g 5);
MAX_LEVEL=maximum QoS level (e.g. 32);
MIN_FR=minimum frame rate (e.g. 10);
MAX_FR=for maximum frame rate (e.g. 24);
MIN_MBR=for minimum bit rate (e.g. 320K);
MAX_MBR=maximum bit rate (e.g. 2048K);
MBR_STEP=bit rate increment (e.g. 64K);
DOWNGRADE_INTERVAL=downgrade interval time (e.g. 1000 milliseconds); and
UPGRADE_INTERVAL=upgrade interval time (e.g. 1000 milliseconds).

The outcome of the process is the setting of the video frame rate (fr) and the video bit rate (mbr) parameters which are subsequently used by the video encoder to encode the next video frame.

The process in FIG. 4 starts, and in step 460, the video capture and streamer module 226 before the encoding of each frame first sets a previous quality level to the value of a current quality level, and further sets a current time to the current system time.

In step 462, the video capture and streamer module 226 determines whether the TCP socket was congested after the transmission of the last video frame. If the TCP socket was congested, the process goes to step 464 where the process attempts to downgrade the quality level by adjusting the value of the current quality level. In this regard, the process sets the value of a last congestion time to the value of the current time, and increments a congestion counter for the current quality level.

In step 466, the process determines whether the current quality level is greater than a preset minimum quality level. If the answer is NO, the process proceeds to step 474 because the process does not downgrade the level below the preset minimum quality level.

If the current quality level is greater than the preset minimum quality level, the process determines whether the difference between the current time and the last downgrade time exceeds a preset downgrade interval. If it does not, the processor proceeds to step 474. According to one embodiment, using a downgrade interval to control how frequently the level is downgraded insures a smoother downgrade process without wild down swings. If the downgrade interval time has been exceeded, the process proceeds to step 468.

In step 468, the video capture and streamer module 226 downgrades the current quality level to the preset minimum quality level if the current quality level is less than or equal to a preset minimum frame rate. If the current quality level is greater than the preset minimum frame rate, the process downgrades the current quality level to either the preset minimum frame rate or the preset minimum QoS level, whichever is a greater value. In either case, after the downgrade has been done, the process proceeds to step 474.

Referring again to step 462, if a determination is made that the TCP socket was not congested, the video capture and streamer module 226 proceeds to step 470 to check if an upgrade of the video quality level is possible. In this regard, the process determines if the current quality level is less than a preset maximum QoS level. If the answer is NO, meaning that the current quality level is already at the maximum level, the process proceeds to step 474.

If the current quality level is less than the preset maximum QoS level, the process proceeds to step 472 to attempt to upgrade the level by a preset amount, such as, for example, by one. In this regard, the process uses a congestion counter for the current quality level to compute a multiplier. According to one embodiment, if the congestion counter is zero, the multiplier is one; if the congestion counter is one, the multiplier is two; if the congestion counter is two, the multiplier is four, and so on. According to one embodiment, the multiplier acts as an exponential dampener. The multiplier is multiplied by a preset upgrade interval time to compute an upgrade delay time. The current time is then subtracted from the greater of either the last upgrade time or the last congestion time, and if the difference has exceeded the computed upgrade delay time, an upgrade take place. If an upgrade is allowed, the current quality level is incremented by one. In either case, the algorithm then proceeds to step 474.

In step 474, the video capture and streamer module 226 checks if either a downgrade or an upgrade of the current quality level has just occurred. If not, the process proceeds to step 482. If an upgrade or downgrade has just occurred, the process determines, in step 476, whether a downgrade has occurred. If the answer is YES, the process proceeds to step 478 where the last downgrade time is set to the current time and the process proceeds to step 482.

If instead in step 476 it is determined that an upgrade has just occurred, the process proceeds to step 480 for setting the congestion counters to zero for all quality levels less than or equal to the current level. That is, because of the upgrade, the process allowed to have confidence in the lack of congestion in all levels less than or equal to the current level to which it has been upgraded. The algorithm then proceeds to step 482.

Step 482 is the culmination of the process where the video frame rate and video bit rate are set based on the results of the algorithm. According to one embodiment, the video bit rate is set to the current quality level multiplied by a preset bit rate increment. In computing the video frame rate, the maximum value of either the current quality level or the preset minimum frame rate is selected. The result is then compared against the preset maximum frame rate. The minimum of the two values is then set as the video frame rate. The process ends, and the video encoder and streamer module 226 uses the set video frame rate and video bit rate to encode the next video frame to be streamed to the client device.

The processes of FIGS. 3-4 may be described in terms of a software routine executed by the corresponding CPU based on instructions stored in memory. A person of skill in the art should recognize, however, that the processes may be executed via hardware, firmware (e.g. via an ASIC), or in any combination of software, firmware, and/or hardware. Furthermore, the sequence of steps of the processes are not fixed, but can be altered into any desired sequence as recognized by a person of skill in the art.

The various example implementations may allow the efficient delivery of interactive applications built for one environment to various mobile devices (and other clients) for which they were not originally written. The various example implementations allow the applications to function on the new platforms with little or no redevelopment of the applications. Application developers will be able to quickly re-purpose their existing application assets to run on the new environments without the need to learn the technical details of the new platforms. The example implementations may also help eliminate the need to download the applications to the new platforms, or purchase separate applications for the new platforms.

According to the above example implementation, the applications are configured to appear to function on the new platform in the same way as they would on the native platform. The example implementation may also allow the applications to be highly responsive to the user's control. The high responsiveness is aided by reducing the latency of upstream inputs from the client to the server running the application, and latency of downstream audio and video from the server to the client.

II. Interactive Application Content Delivery Using Video Conferencing Solutions

Example implementations provide a software system and method by which content (e.g., audio data and display data) from software applications built for one native application environment can be interactively delivered to and experienced on a multiplicity of application environments either native or non-native and specifically to that system and method that delivers the content of those applications through existing video conferencing solutions, negating the requirement for a special purpose player on the client-side. Although examples are described with regard to mobile devices, those skilled in the art will recognize that it could be to any client device.

As an overview, the following shows an example flow, in one embodiment of the present invention using a WebRTC video conferencing solution, when the client is a mobile device, a method for delivering interactive applications built for one platform to a multiplicity of application environments using an existing WebRTC video conferencing solutions includes but is not limited to the following steps:

1. On a mobile device, the end user selects an interactive application (e.g. by clicking on a link within a browser).
2. The player controller on the mobile device makes an HTTP GET request to what component to retrieve a JavaScript Object Notation (JSON) configuration file.
3. The player controller makes an HTTP POST request to the load balancer on the mobile application (app) monitoring server in order to start an instance of the selected application.
4. The load balancer proxies the request to the provisioner on an available mobile application delivery server which responds with the following (1) credentials (username/password), (2) IP address of the selected mobile application delivery server and (3) port that the WebRTC signaling server is listening on.
5. The player controller establishes a WebSocket connection to the control server on the mobile application delivery server and follows the control server protocol to authenticate, send session parameters (e.g. resolution, bit-rate, fps, etc.) and makes a session launch request.
6. The control server responds to the player controller on the mobile device with a launch response indication a successful session launch.
7. The player controller establishes a connection to the WebRTC signaling server on the mobile application delivery server and exchanges ICE candidates and session description (offer/response) to establish the WebRTC session.

8. The audio and video of the selected application running in the application environment are captured respectively by the audio capture and video capture components on the mobile app delivery server and then are streamed to the client by the WebRTC streamer. For example, the video capture module/component may receive display data (e.g., a plurality of display frames) output from the application and then convert (e.g., encode) the display data (or display frames) to a plurality of video frames for streaming via a video conferencing (e.g., WebRTC) endpoint to a peer video conferencing endpoint at the client device (e.g., mobile device) via the video conferencing (e.g., WebRTC) session.

9. The player controller on the mobile device is notified through the WebRTC Web API callback when the audio/video stream is ready to be presented, and the player controller attaches the stream to an HTML5 video element.

10. The player controller handles user input and relays the input to the control server.

11. To disconnect either the control server informs the player controller that the session has concluded, or the player controller initiates a disconnect.

Figure 5:
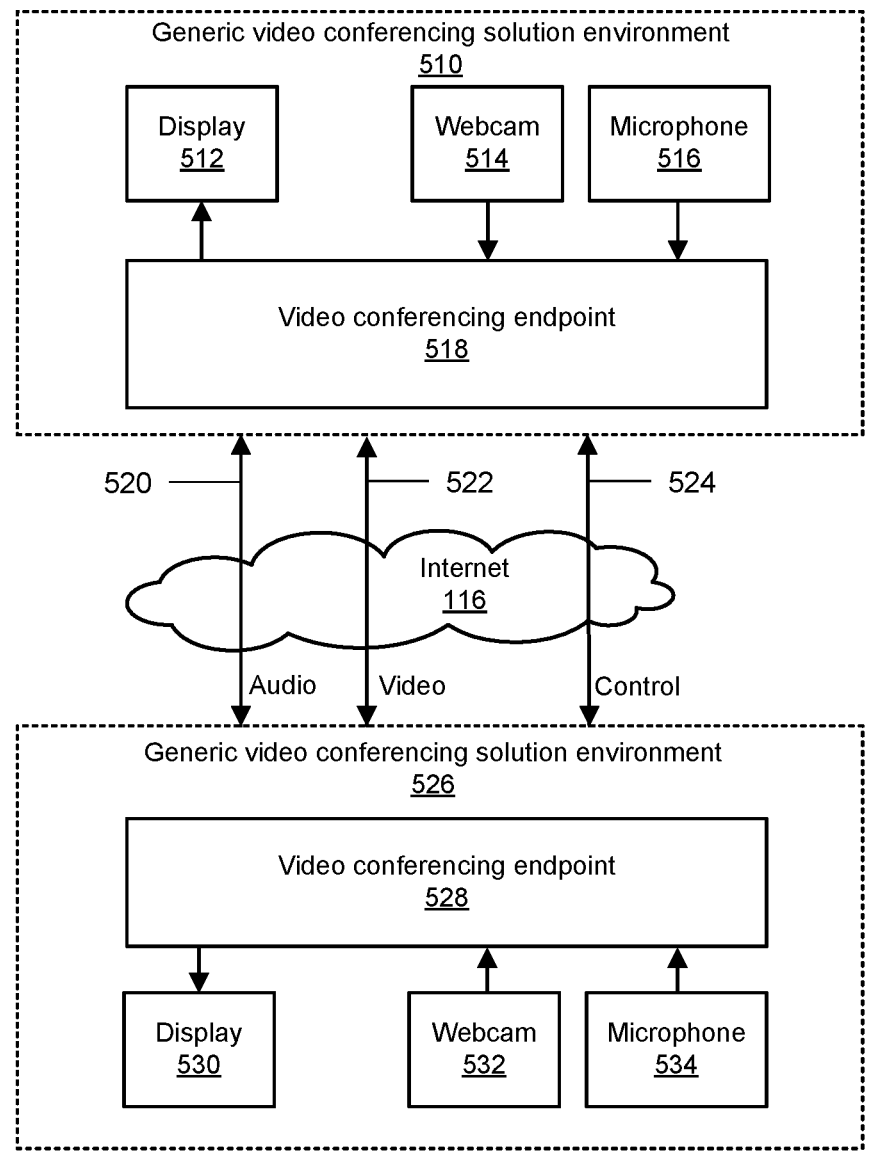
FIG. 5 is an overview block diagram of a generic video conferencing solution according to an example implementation.

FIG. 5 is an overview block diagram of a generic video conferencing solution according to example implementation.

According to one example implementation, a generic video conferencing solution may be used, which may include but is not limited to at least two generic video conferencing solution environments (or video conferencing systems) 510 and 526 which contain the video conferencing components required for a video conference between them.

According to one example implementation, the generic video conferencing solution environments 510 and 526 include but are not limited to identical components at each endpoint which include but are not limited to the video conferencing endpoints 518 and 528, the display components, 512 and 530, the webcam components 514 and 532, and the microphone components 516 and 534. The webcam components 514 and 532 and the microphone components 516 and 534 respectively capture the video and audio of participants at their endpoint and using the services of their respective video conferencing endpoints 518 and 528 encode and stream audio 520, video 522 and optional control streams 524 between endpoints where they are decoded and processed by the video conferencing endpoints 518 and 528 for display/playback on their respective display devices 512 and 530.

Figure 6:
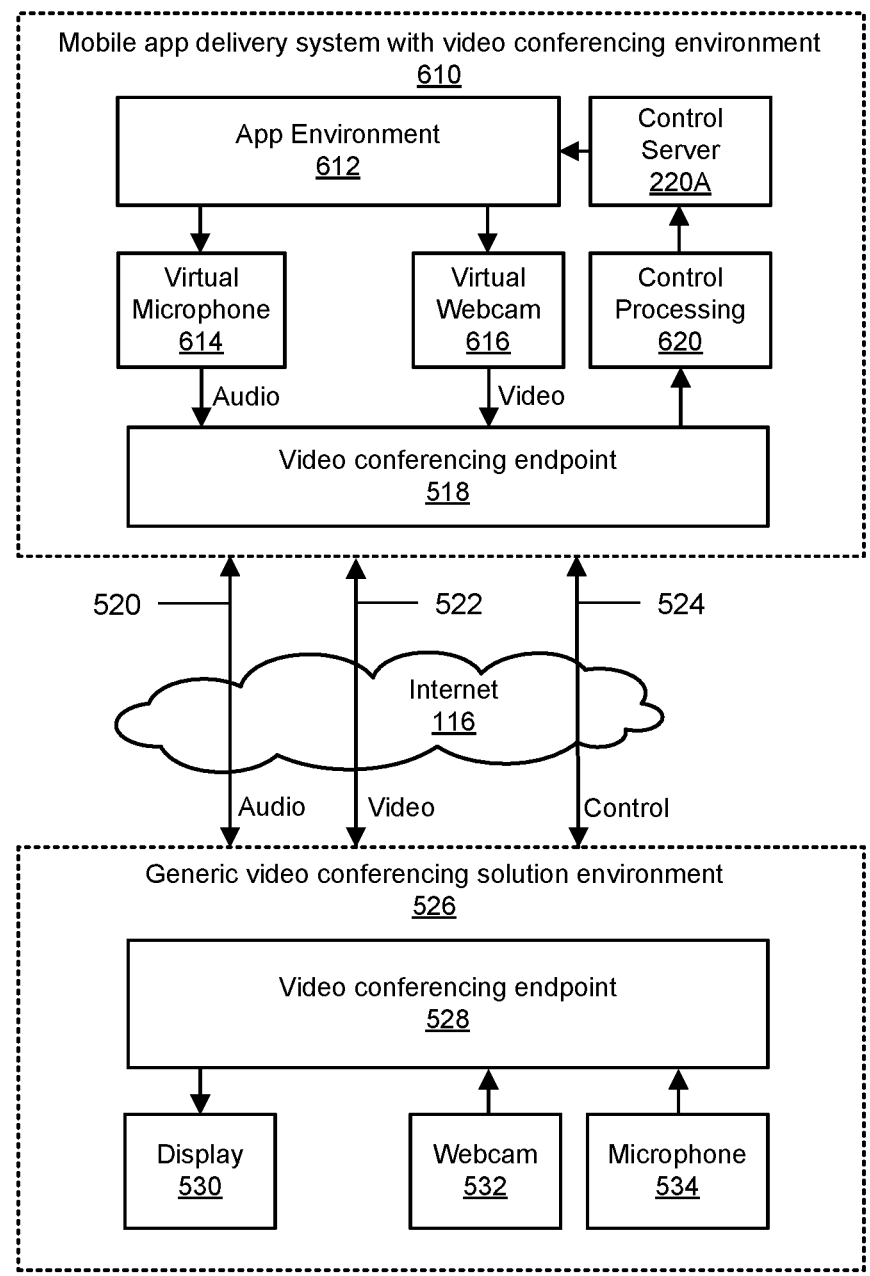
FIG. 6 is an overview block diagram of a system to deliver applications to non-native client platforms using a generic video conferencing solution according to an example implementation.

FIG. 6 is an overview block diagram of a system to deliver applications to non-native client platforms using a generic video conferencing solution according to one example implementation.

According to one example implementation, the system includes a mobile application delivery system 610 with video conferencing environment (including a video conferencing endpoint 518), which may be similar to the mobile application delivery system environment 110 described above with respect to FIG. 2. The system also includes an application (app) environment 612, which may be similar to the application environment 222 described above with respect to FIG. 2. The system also includes a control server 220a, which may be similar to the control server 220 described above with respect to FIG. 2.

According to an example implementation, the system also includes a virtual microphone 614, which captures the audio output of an application from the application environment 612. The system also includes a virtual webcam 616, which captures the video output of an application from the application environment 612. In particular, the virtual webcam 616 may receive display data (e.g., display frames) from the application, and may then convert the display data (or display frames) to video frames for streaming. The system 610 also includes a video conferencing endpoint 518. The video conferencing endpoint 518 is capable of encoding and streaming audio and video outputs from the virtual microphone 614 and virtual webcam 616 respectively and encoding and streaming audio 520, video 522 and control 524 over a network 116 to generic video conferencing solution environment 526 (including a video conferencing endpoint 528 provided within a client device), which may be similar to the generic video conferencing solution environment 526 described above with respect to FIG. 5. The video conferencing endpoint 518 also is capable of receiving over a network 116 audio 520, video 522 and control 524 streams from another generic video conferencing solution environment 526 (and from video conferencing endpoint 528) at a client device. In this manner, for example, audio/video content of an application running on application delivery system 610 may be captured by virtual microphone 614 and virtual webcam 616 and streamed via video conferencing endpoint 518 to a video conferencing endpoint 528 at a client device to allow the application audio/video content to be output/displayed by the client device without the application being present (including without the application being installed or running) on the client device.

Also, user input signals may be streamed or transmitted from the client device to the application delivery system 610 where the user input signals may control operation of the application running on the application delivery system 610. Thus, in this manner, the user input signals or control signals from the client device may cause the display data and/or audio data output by the application to be changed, adjusted or modified based on the user input signals/control signals from the client device. According to an example implementation, control processing 620 within the application delivery system 610 may receive, from a client device, user input signals (or interaction data) with respect to an application or in response to the display/output of content from the application that is being output by the client device, e.g. without the application being present (including without the application being installed or running) on the client device.

Application delivery system 610 may receive the user input signals (or control signals), for example, via an audio channel, a video channel or a control channel of a video conferencing (e.g., WebRTC) session, or may receive control signals or user input signals via a separate or side control channel. User input signals may be, for example, user input signals provided via one or more input devices of the client device, e.g., key presses, gestures on a touch screen of the client device, joystick inputs, etc., where such user input signals may be transmitted via a control channel, for example. Alternatively, user input signals may be provided as an audible input (e.g., a voice/speech command spoken by the user to control the application) that may be received via a microphone 534 of the client device, recorded as audio data, and, for example, sent by video conferencing endpoint 528 of client device via an audio channel (or a control channel) of the video conferencing session to the video conferencing endpoint 518 of application delivery system.

Alternatively, user input signals may be provided as a visual gesture (e.g., an arm or hand motion by the user to control the application) by a user that may be received or detected via a webcam 532 of the client device, recorded as video data, and, for example, sent by video conferencing endpoint 528 of client device via a video (or a control) channel of the video conferencing session to the video conferencing endpoint 518 of application delivery system. In an example implementation, the user input signals by a user (including the audible inputs or visual gestures) may be converted, by the client device based on a configuration file associated with the application, or by control processing 620 or control server 220a of the application delivery system 610, to a control signal or a command to be input to the application. The user input signal from the client device may be converted to a control signal or command that is input or provided to the application, or the user input signal may be directly input to the application.

The application, running on the application delivery system 610, may be controlled based on (or in response to) the user input signal/control signal/command provided to the application, e.g., the application may change, adjust or update the audio/video (or display) signals output by the application based on the one or more received user input signals/control signals/commands from the client device, e.g., without the application being present (e.g., including without the application being installed or running) on the client device. This process may be repeated, e.g., the updated/changed audio/video signals (that were updated/changed by the application based upon or in response to signals from the user of the client device) may be streamed by video conferencing endpoint 518 of the application delivery system 610 via a video conferencing session to the video conferencing endpoint 528 of the client device, where such updated/changed audio/video content from the application may be output/displayed via the client device to the user, even though the application is not present on the client device.

In an example implementation, a user of a client/mobile device may generate audible inputs (e.g., voice/spoken audible commands by a user, such as "stop", "turn left", etc., to provide feedback or control to the application), which may be received/captured by microphone 534, transmitted via an audio (or control) channel of the WebRTC session to the application delivery system 610, and then converted by control processing 620, or by control server 220a (FIG. 8), to control (or text) commands via speech-to-text functions, or other command conversion functions.

Figure 8:
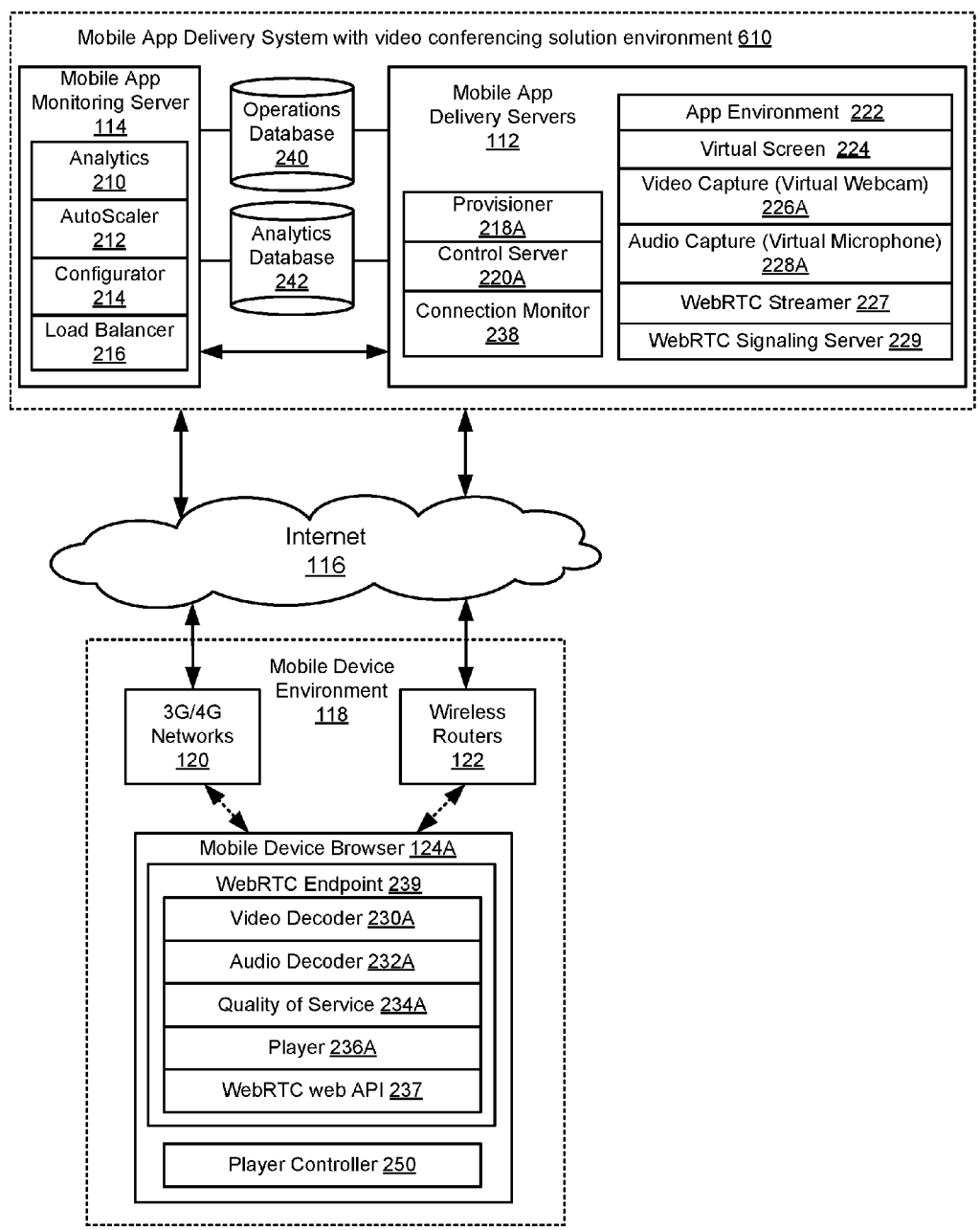
FIG. 8 is an overview block diagram of a system to deliver applications to non-native platforms using a WebRTC video conferencing solution according to according to an example implementation.

In another example, a user of a client/mobile device may generate a visual gesture (e.g., a user moving a hand or arm to indicate a specific command with respect to the application), which may be captured by a webcam 532, transmitted (e.g., within one or more video frames) via a video channel (or a control channel) of the WebRTC session to the application delivery system 610, and then converted to control (or text) commands by command conversion functions (e.g., image processing logic to detect specific visual gestures by a user on a received video) within control processing 620 or by control server 220a (FIG. 8). These converted audible inputs or visual gestures from a user of the client/mobile device (user input signals) may then be provided to the application running in the application environment.

These user input signals, as examples, may be provided or input to the application, where such user input signals may cause the application to change or adjust the display data and audio data output by the application, which may result in a change or update to the display data and/or audio data output by the application, which in turn, may result in an update or change to the video frames output by the virtual webcam 616 and/or the audio data output by the virtual microphone 614 for streaming back to the client/mobile device via the video conference (e.g., WebRTC) session.

Figure 7:
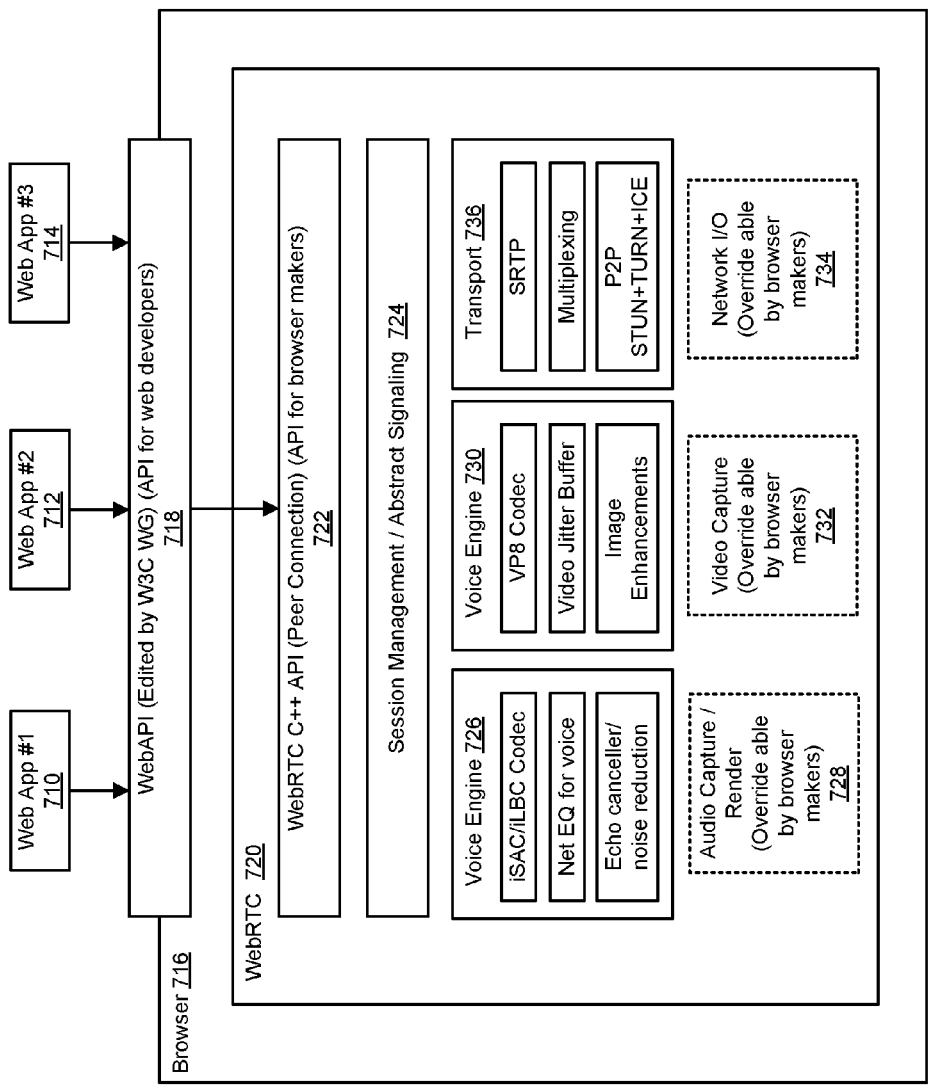
FIG. 7 is an overview block diagram of a WebRTC video conferencing endpoint within a browser within a mobile device according to according to an example implementation.

FIG. 7 is an overview block diagram of a WebRTC video conferencing endpoint within a browser within a mobile device according to an example implementation.

According to one example implementation, a WebRTC video conferencing solution is used on both the server and client side. On the server side it may be integrated with the mobile application delivery system 610 as described above with reference to FIG. 6. On the mobile device client side, in one example implementation, it may be contained within commonly used browsers on mobile devices. On the client side the interface for client side web applications 710, 712, 714, etc. is exposed through the WebAPI component 718.

According to one example implementation, a WebRTC video conferencing solution may be used by and is not limited to the WebRTC 720 environment, the WebRTC C++ API 722, the session management 724 component, the voice engine 726, the video engine 730, the transport component 736.

The system also includes several components that can be overridden, such as an audio capture/render component 728, a video capture component 730, and a network I/O component 734. On the server side (e.g., FIG. 6) the virtual microphone 614 described above with respect to FIG. 6 overrides the microphone 516 (FIG. 5), which captures audio from a participant. On the server side the virtual webcam 616 described above with respect to FIG. 6 overrides the webcam 514 (FIG. 5), which captures video from a participant. On the client side within a browser 716 the audio capture/render component 728, the video capture component 732, and the network I/O component 734 are all overridden by the browser maker.

With respect to the audio signal on the server side, the term override means, for example, that the virtual microphone 614 may be selected to provide audio input to a video conferencing endpoint 518 (FIG. 6) from an application within the application delivery system 610, instead of providing an audio input to the video conferencing endpoint 610 from the microphone 516, which captures audio of a participant. In this manner, the audio signal output from the application (via the virtual microphone 614) may be selected as an input to the video conferencing endpoint 610, rather than selecting the audio signal from the participant (via the microphone 516). With respect to the video signal, overriding means, for example, that the virtual webcam 616 may be selected to provide video input to the provide video input to a video conferencing endpoint 518 (FIG. 6) from an application within the application delivery system 610, instead of providing an video input to the video conferencing endpoint 610 from the webcam 514, which captures video of a participant. In this manner, the video signal (or display data) output from the application (via the virtual microphone 614) may be selected as an input to the video conferencing endpoint 610, rather than selecting the video signal from the participant (via the webcam 514). In an example implementation, the virtual webcam 616 may receive display data (e.g., one or more display frames) output from the application, convert the display data to a plurality of video frames which may be output to the video conferencing endpoint 518 for streaming to the other video conferencing endpoint 528 provided on the mobile/client device.

FIG. 8 is an overview block diagram of a system to deliver applications to non-native platforms using a WebRTC video conferencing solution according to one example implementation. According to one example implementation, the system may include a mobile application delivery system with video conferencing solution environment 610, which may be similar to the mobile application delivery system environment 110 described above with respect to FIG. 2.

FIG. 8 is an overview block diagram of various modules hosted by the monitoring servers 114, delivery servers 112, and mobile devices 124 according to one example implementation. The various modules are implemented via computer program instructions, which are stored in memory for executing by the CPU of the corresponding server. A person of skill in the art should recognize, however, that all or a portion of the various modules may be implemented via firmware, hardware, or a combination of software, firmware, and/or hardware.

Except where noted the components in FIG. 8 are similar in kind, description, function and operation to identically named and numbered components described above in FIG. 2 according to one example implementation. Referring to FIG. 8, according to one example implementation, the components resident in the mobile application delivery servers 112 modified or added from the system described above for FIG. 2 are the following: the provisioner 218*a*, the control server 220*a*, the video capture (virtual webcam) 226*a*, the audio capture (virtual microphone) 228*a*, the WebRTC streamer 227, and the WebRTC signaling server 229 components. These modified or added components will be described below.

According to one example implementation, the provisioner 218*a* is modified from the original description for FIG. 2 above to provide an additional parameter in its response, the WebRTC signaling port to be used.

According to one example implementation, the control server 220*a* is modified from the original description for FIG. 2 above to provide an additional interface, WebSocket, on which it listens for client connections. Previously the control server 220 described above for FIG. 2 only listened for client connections on a raw TCP socket. The protocol employed over either a TCP socket or a WebSocket remains unchanged. According to one example implementation, a side channel for control is established by the control server 220*a* using a WebSocket. In another example implementation, a side channel for control could be established using an RTCDataChannel.

According to one example implementation together the video capture 226*a*, audio capture 228*a* and WebRTC Streamer 227 components of FIG. 8 perform the same functions as the video capture and streamer 226 and audio capture and streamer 228 of the original patent application described above for FIG. 2. Referring to the WebRTC system architecture depicted in FIG. 7 the audio capture/render 728 of FIG. 7 is overridden by the audio capture 228*a* component of FIG. 8 and the video capture 732 of FIG. 7 is overridden by the video capture 226*a* component of FIG. 8. Referring again to the WebRTC system architecture depicted in FIG. 7, the transport model 736 handles the audio and video streaming, in FIG. 8 the WebRTC streamer 227 represents this component in the block diagram.

According to one example implementation, the WebRTC signaling server 229 of FIG. 8 establishes a WebSocket and proxies ICE candidates and SDP data between the WebRTC streamer 227 and the client device. The WebRTC framework depicted in FIG. 7 uses the ICE framework for finding candidates (a process to determine potential network interfaces and ports to establish a connection) and it uses SDP (session description protocol) for describing media (audio/video) configuration information. However WebRTC does not define a signaling mechanism for communicating this information between peers. Therefore the WebRTC signaling server 229 of FIG. 8 in the mobile app delivery server 112 is the component that establishes a WebSocket and proxies ICE candidates and SDP configuration data between the WebRTC streamer component 227 and the client.

Still referring to FIG. 8, according to one example implementation, on the client side within the mobile device environment 118, several components described above in FIG. 2 for the original patent application are added, modified or subsumed by the WebRTC endpoint environment 239 within the mobile device browser 124*a*. These modified, added or subsumed components include but are not limited to, the video decoder 230*a*, the audio decoder 232*a*, the quality of service 234*a*, the player 236*a* and the WebRTC Web API 237 components. In addition a player controller 250, outside of the WebRTC endpoint environment 239, and implemented entirely in JavaScript is added according to one embodiment of the present invention. These modified, added or subsumed components will be described below.

According to an example implementation, the ubiquitous presence of WebRTC endpoint environments in many browsers is leveraged to provide streaming of audio/video streams between server and clients and to eliminate the need to download and install software in mobile devices to accomplish these functions. Because of that purpose built components described for FIG. 2 of the original patent application are no longer needed and are subsumed by the capabilities of the ubiquitously present WebRTC endpoint solutions within mobile device browsers. These components from FIG. 2 described above that are subsumed by capabilities of the WebRTC endpoint solutions include but are not limited to, the video decoder 230, the audio decoder 232, the quality of service 234 and the player 236 components.

Still referring to FIG. 8 according to one embodiment of the present invention, inside the mobile device environment 118, there is a mobile device browser 124*a* that contains a WebRTC endpoint 239 environment. Examples of mobile device browsers that include WebRTC endpoints 239 includes but is not limited to Google Chrome, Mozilla Firefox, and Opera.

Still referring to FIG. 8 according to an example implementation, within the WebRTC endpoint 239 environment, the video decoder 230*a* component performs the video decoding function performed by the video decoder 230 component described above for FIG. 2. Also within the WebRTC endpoint 239, the audio decoder 232*a* component performs the audio decoding function performed by the audio decoder 232 component described above for FIG. 2. Also within the WebRTC endpoint 239, the quality of service 234*a* component performs the quality of service functionality performed by the quality of service 234 component described above for FIG. 2.

Still referring to FIG. 8 according to an example implementation, within the WebRTC endpoint 239 environment, the WebRTC Web API 237 exposes an API interface accessible e.g. via JavaScript that allows a Web App running in the mobile device browser 124*a* to control the functionality of the WebRTC endpoint 239.

Still referring to FIG. 8 according to an example implementation, within the mobile device browser 124*a* there is a JavaScript client component named the player controller 250. The player controller 250 is analogous, with exceptions noted below, to the player 236 component described above for FIG. 2. The player controller 250 unlike the player component 236 of the original patent application does not handle decoding or playback/display of the audio and video streams. Those functions are provided in an example implementation by the WebRTC endpoint 239 and its subcomponents.

In an example implementation, the player controller 250 connects to the control server 220a using a WebSocket rather than a raw TCP socket. The player controller 250 also establishes a connection to the WebRTC signaling server 229 through a WebSocket. The player controller 250 uses the "WebRTC signaling channel" to exchange ICE candidates and SDP messages between the WebRTC endpoint 239 in the mobile device browser 124a with the WebRTC signaling server 229 on the mobile app delivery servers 112.

In contrast to FIG. 2, in an example implementation, the WebRTC endpoint 239 using the video decoder 230a and audio decoder 232a components handles both audio and video decoding and playback and rendering. The player controller 250 establishes a WebRTC session using the WebRTC Web API 237. In order to establish the session, the player controller 250 also gets and or sets the signaling information in order to establish the WebRTC session. The player controller 250 also handles input (touch/keyboard) events from the end user and transmits them using the control channel protocol to the control server 220a on the mobile app delivery servers 112. The player controller 250 also controls the presentation of the stream (e.g. rendered size, orientation etc.) for presentation to the end user within the mobile device browser 124a.

Figure 9A:
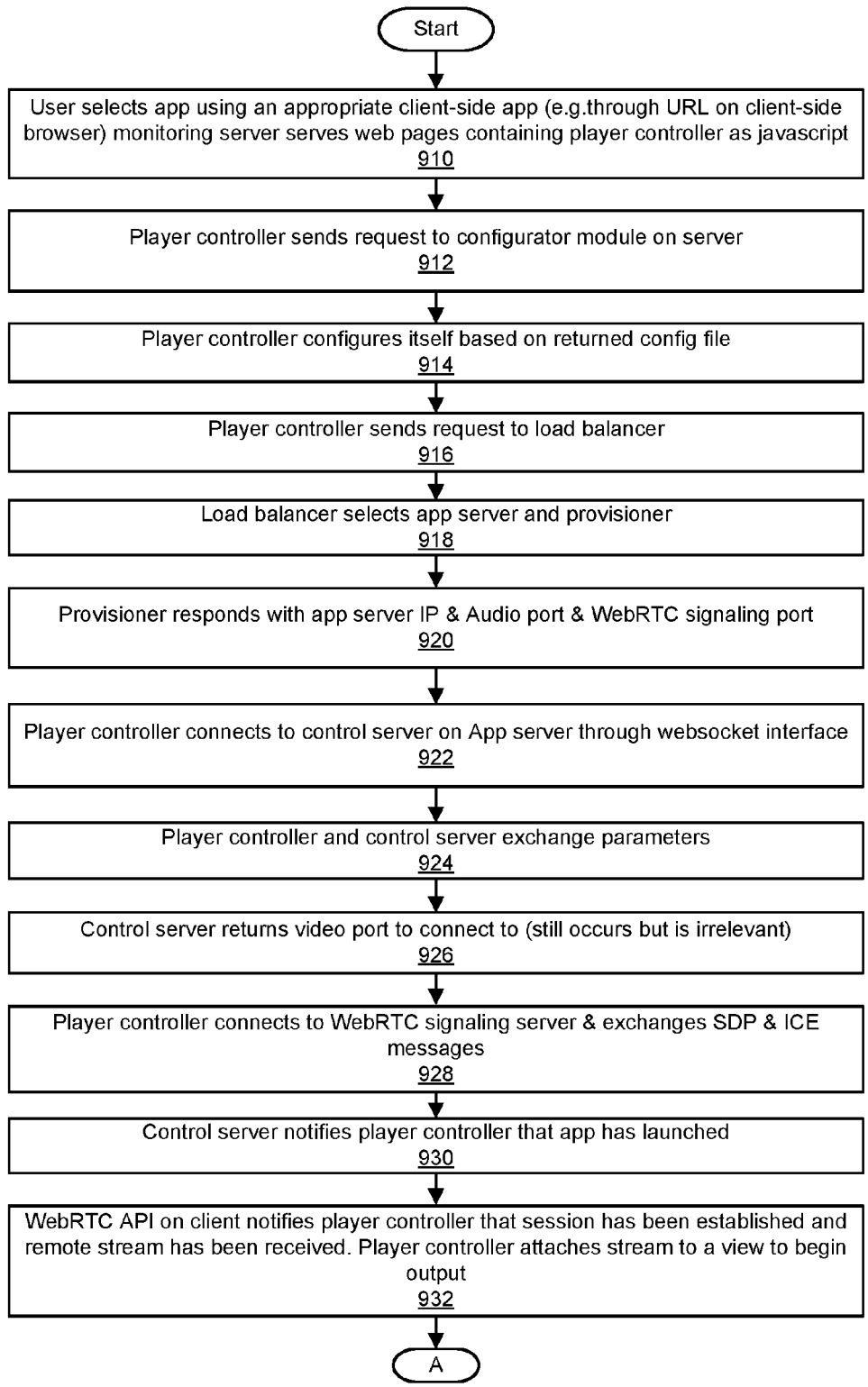
FIGS. 9A-9B are flow diagrams of a process for providing interactive content generated by an application configured to run in one application environment, to a client device providing a different application environment, using a WebRTC video conferencing solution to encode, stream and decode video and audio streams between server and client according to an example implementation.
Figure 9B:
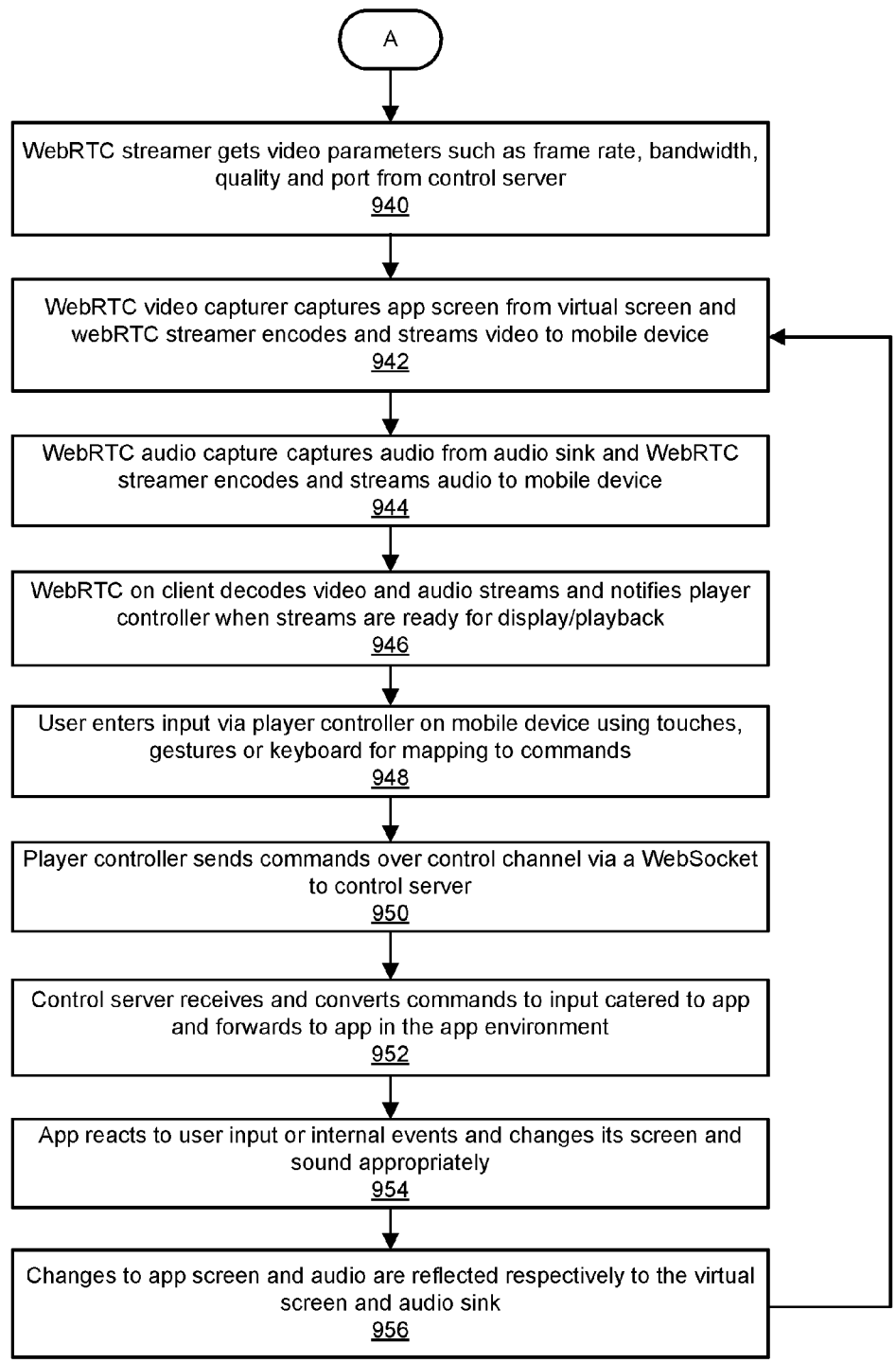

FIGS. 9A-9B are modified flow diagrams from FIGS. 3A and 3B, of a process for providing interactive content generated by an application configured to run in one application environment, to a client device providing a different application environment, using a video conferencing solution to stream and decode audio and video content from server to client according to an example implementation.

The process starts, and the monitoring server 114 receives from the client device 124a identification of the particular software application to be invoked. In one embodiment of the present invention, the user selects an application through a URL on the client-side browser. In this regard, the mobile application monitoring server 114 receives the user selection of the particular application in step 910 of FIG. 9a. The mobile application monitoring server 114 serves web pages, which contain the player controller 250 as included JavaScript. In another embodiment of the present invention, it can be served from a CDN (e.g. Amazon S3).

Still referring to FIG. 9a of the present invention, in step 912, the player controller 250 on the client device 124a sends a request for the selected application to the configurator 214 on the monitoring server 114.

In step 914 the configurator 214 returns the appropriate configuration file for the selected application back to the player controller 250, and the player controller 250 configures itself based on the parameters of the returned configuration file. For example, the player sets its display resolution, maximum bit rate, maximum frame rate, audio and video codec used, and the like.

In step 916, the player controller 250 sends a request to the load balancer 216 on the monitoring server 114 to start an instance of the selected application.

In step 918, the load balancer identifies and selects a specific delivery server 112 and an instance of the provisioner 218a on the same delivery server. According to one embodiment, the load balancer may select a delivery server, which is geographically close to the client device.

In step 920 the provisioner 218a responds to the load balancer 216, who responds to the player controller 250, with parameters that include credentials for accessing the created instance of the delivery server 112, an IP address of the delivery server, and an audio port and a WebRTC signaling port on the delivery server, to which the player should connect.

In step 922, the player controller 250 uses the parameters returned in step 920 to connect on the control channel through the WebSocket interface to the instance of the control server 220a selected for the instance of the application.

In step 924 the control server 220a and the player controller 250 exchange over the control channel, parameters (e.g. username and password) for the instance of the application, frame rate, bit rate, supported video and audio codec, and the like.

In step 926 the control server 220a responds to the player controller 250 over the control channel with the video port on the delivery server 112 in which the player should connect. This step still occurs for compatibility reasons but is irrelevant in this embodiment of the invention.

In step 928 the player controller 250 connects to the WebRTC signaling server 229 of FIG. 8, on the signaling port specified by the specified by the provisioner 218a, and exchanges SDP and ICE candidate messages to establish the WebRTC session.

In step 930 the control server 220a invokes the application in the application environment provided by the delivery server 112 and notifies the player controller 250 that the selected application has finished launching.

In step 932 the WebRTC API 237 on the client notifies the player controller 250 that the session has been established and the remote stream has been received and the player controller 250 attaches the stream to an HTML5 video element to begin display and playback. The selected application generates screen display outputs and provides the outputs on the virtual screen 224 on the delivery server 112.

Now referring to FIG. 9b in step 940 the WebRTC streamer 227 of FIG. 8 obtains video parameters, such as, for example, frame rate, bandwidth, bit rate, and video port, from the control server 220a.

In step 942 the WebRTC video capture component 226a, the overridden video capture module described above with reference to FIG. 8, captures the selected app's video running in the app environment 222 from the virtual screen 224 and passes it to the WebRTC streamer 227 which encodes and streams the video to a mobile device.

In step 944 the WebRTC audio capture component 228a, the overridden audio capture module described above with reference to FIG. 8, captures the selected app's audio running in the app environment 222 from the audio sink and passes it to the WebRTC streamer 227 which encodes and streams the audio to a mobile device.

In step 916, on the client, the video decoder 230 and the audio decoder 232a of the WebRTC endpoint 239 are responsible for decoding the video and audio streams respectively and notifying the player controller 250 via the WebRTC Web API 237, when the streams are ready for display and playback. The player controller 250 attaches the streams to an HTML5 video element for display/playback.

In step 948, the user enters input to the selected application via the player controller 250 using touches, gestures, keyboard entry, or any other form of input. According to one embodiment, the player controller 250 maps the user input (e.g. downward swipe, shaking of the device, changing orientation of the device, tapping on the screen, and the like) to a particular command defined in the configuration file for the application provided to the client device. For example, changing the orientation of the device may be mapped to a "sendOrientationChanged" command which receives, as a parameter, the orientation of the device. The change of orientation of the device and other inputs to the device are interpreted according to conventional mechanisms that will be understood by a person of skill in the art.

In step 950, the player controller 250 sends the mapped command(s) over the control channel (established through a secure WebSocket as opposed to a TCP socket of the original patent application) to the control server 220*a*.

In step 952 the control server 220*a* converts the commands received from the player controller 250 to a corresponding input catered to the particular application (e.g. mouse or keyboard command understood by the application), and forwards the converted input commands to the application in the application environment 222.

In step 954, the selected application reacts to the user input or internal events, and changes its screen and sound output appropriately.

In step 956 the changes to the screen are reflected onto the virtual screen 224 and the changes to the sound to the audio sink. The sequence then goes to step 942, and the streaming of video and audio to the client device continues.

According to an example implementation, a system is provided including a plurality of host devices, a client device, and a server coupled to the plurality of host devices and the client device over a data communications network, each host device hosting a software application configured to run on an application environment provided by the host device, and the client device receiving interactive content generated by a particular software application configured to run on an application environment different than an application environment provided by the client device. The server may include: a processor; and a memory coupled to the processor and storing program instructions therein, the processor being configured to execute the program instructions, the program instructions including: receiving from the client device identification of the particular software application; identifying one of the plurality of host devices hosting the particular software application; invoking the particular software application on the application environment provided by the identified host device; periodically capturing and encoding a screen display output generated by the particular software application into a plurality of video frames in such a way that overrides the virtual webcam component of a video conferencing endpoint; streaming the plurality of video frames over the data communications network during a streaming session using a video conferencing endpoint; receiving from the server at the client device the plurality of video frames over the data communications network during a streaming session using a video conferencing endpoint; receiving interaction data from the client device in response to the streamed video frames; converting the interaction data to a corresponding input catered to the particular software application; and providing the input to the particular software application, wherein the software application is configured to generate a second screen output in response.

According to an example implementation, the program instructions further include: identifying a configuration file associated with the particular software application; transmitting the configuration file to the client device, wherein the client device is configured to map a user input to a particular command based on the configuration file; and receiving the particular command from the client device as the interaction data. In an example implementation, the client device may be a mobile phone or electronic tablet. In an example implementation, the second screen may be output in real-time with the providing of the interaction data by a user of the client device. In an example implementation, the video conferencing endpoint used is a WebRTC video conferencing endpoint.

One or more example implementations may relate generally to providing a software system and method by which software applications built for one native application environment can be interactively delivered to and experienced on a multiplicity of application environments either native or non-native and specifically to that system and method that delivers the content of those applications through existing video conferencing solutions, negating the requirement for a special purpose player on the client-side.

According to an example implementation, an apparatus may include at least one processor and at least one memory including computer instructions, when executed by the at least one processor, cause the apparatus to:

1) establish, by an application delivery system in response to an identification of an application from a client device, a video conferencing session between a first video conferencing endpoint provided on the application delivery system and a second video conferencing endpoint provided on a client device. For example, in response to an identification of an application from a client device, an application delivery system 610 may establish a video conferencing session (e.g., WebRTC session) between video conferencing endpoint 518 provided on the application delivery system 610 and a video conferencing endpoint 528 (e.g., FIG. 6) provided on a client device.

2) select a video capture module as a video input device for the first video conferencing endpoint. For example, video conferencing endpoint 518 may select a video capture module/virtual webcam 616 to provide video input to video conferencing endpoint 518 (FIG. 6) from an application within the application delivery system 610, instead of providing an video input to the video conferencing endpoint 610 from the webcam 514, which captures video of a participant. In this manner, the video signal (or display data) output from the application (via the virtual microphone 614) may be selected as an input to the video conferencing endpoint 610, rather than selecting the video signal from the participant (via the webcam 514).

3) receive, by the video capture module provided on the application delivery system, display data output by the application; For example, the video capture module/virtual webcam 616 (e.g., FIG. 6) may receive display data (e.g., one or more display frames) output from the application, and 4) convert, by the video capture module, the display data to a plurality of video frames. For example, the video capture module/virtual webcam 616 (e.g., FIG. 6) may convert the display data (e.g., display frames output by the application) to a plurality of video frames which may be output to the video conferencing endpoint 518 for streaming to the other video conferencing endpoint 528 provided on the mobile/client device.

5) stream the plurality of video frames received via the video capture module from the first video conferencing endpoint to the second video conferencing endpoint via the video conferencing session. For example, video conferencing (e.g., WebRTC) endpoint 518 may stream the plurality of video frames (received from the video capture module/virtual webcam 616) to the video conferencing (e.g., WebRTC) endpoint 528 provided on the client device via the video conferencing (e.g., WebRTC) session. And, 6) receive, by the application delivery system from the client device, a user input signal for the application. For example, application delivery system 610 may receive a user input signal from a user of the client/mobile device, e.g., via a control channel, an audio channel or a video channel of the video conferencing session, or via a separate/side control channel.

According to an example implementation, the video capture module may include a virtual webcam that is configured to interface between the application and the first video conferencing endpoint and to output a plurality of video display frames in a format that is compatible with the first video conferencing endpoint. For example, video capture module/virtual webcam 616 may convert the display data/display frames having a first format (e.g., having a first screen resolution, frame rate, maximum bit rate, or other format parameters) to a plurality of video frames having a second format (e.g., having a second screen resolution, frame rate, maximum bit rate or other format parameters) that is compatible with the video conferencing endpoints 518 and 528.

According to an example implementation, the computer instructions that cause the apparatus to receive may include computer instructions that cause the apparatus to: receive, by the video capture module (e.g., video capture module/virtual webcam 616, FIG. 6), one or more display frames output by the application; and buffer, by the video capture module, each of the one or more display frames.

According to an example implementation, the computer instructions that cause the apparatus to convert may include computer instructions that further cause the apparatus to: convert, by the video capture module (e.g., video capture module/virtual webcam 616), the display data from a first frame format (e.g., having a first screen resolution, frame rate, maximum bit rate, or other format parameters) to a plurality of video frames having a second frame format (e.g., having a second screen resolution, frame rate, maximum bit rate, or other format parameters).

According to an example implementation, the apparatus may further include computer instructions that cause the apparatus to:

1) select an audio capture module as an audio input device for the first video conferencing endpoint. For example, video conferencing endpoint 518 may select audio capture module/virtual microphone 614 as an audio input device for the video conferencing endpoint 518, e.g., to receive the audio data/signals from the application.

2) receive, by the audio capture module provided on the application delivery system, audio data output by the application. For example, audio capture module/virtual microphone 614 may receive the audio data/signals from the application.

3) stream the audio data received via the audio capture module from the first video conferencing endpoint to the second video conferencing endpoint via the video conferencing session. For example, video conferencing endpoint 518 may stream the audio data/signal received via the audio capture module/virtual microphone 614 to video conferencing endpoint 528 via the video conferencing session.

According to an example implementation, the audio capture module may include a virtual microphone (e.g., an audio capture module/virtual microphone 614) that is configured to interface between the application and the first video conferencing endpoint and to output audio data in a format that is compatible with at least the first video conferencing endpoint.

According to an example implementation, the computer instructions that cause the apparatus to receive, by the audio capture module, may include computer instructions that cause the apparatus to: receive, by the audio capture module (e.g., audio capture module/virtual microphone 614), audio data output by the application in a first audio format (e.g., a first audio format having sampling rate, word length or other format parameters) associated with the application; convert, by the audio capture module, the audio data output by the application from the first audio format to a second audio format (e.g., a second audio format having sampling rate, word length or other format parameters) that is associated with (e.g., compatible with) at least the first video conferencing endpoint; and output the audio data in the second audio format to the first video conferencing endpoint.

According to an example implementation, the apparatus may further include computer instructions that cause the apparatus to: establish a control channel between the application delivery system and the client device; and receive, by the application delivery system from the client device via the control channel, the user input signal for the application. The user input signal may be a variety of user input signals such as a user's gesture or input on an input device (e.g., keyboard, mouse, trackpad, touchscreen), an audible input or a visual gesture by the user, or other user input signal or control signal.

According to an example implementation of the apparatus, the computer instructions that cause the apparatus to receive, by the application delivery system from the client device, a user input signal may include instructions that cause the apparatus to: receive, by the application delivery system from the client device via the video conferencing session, a user input signal from a user of the client device, the user input signal provided as at least one of: a first signal indicating a visual gesture by the user that is streamed by the second video conferencing endpoint to the first video conferencing endpoint via a video channel of the video conferencing session; and a second signal indicating an audible input by the user that is streamed by the second video conferencing endpoint to the first video conferencing endpoint via an audio channel of the video conferencing session.

For example, a user of a client/mobile device may generate audible inputs (e.g., voice/spoken audible commands by a user, such as "stop", "turn left", etc. to provide feedback or control to the application), which may received/captured by microphone 534, transmitted via an audio (or control) channel of the WebRTC session to the application delivery system 610, and then converted by control processing 620 to control (or text) commands via speech-to-text functions, or other command conversion functions. In another example, a user of a client/mobile device may generate a visual gesture (e.g., a user moving a hand or arm to indicate a specific command with respect to the application), which may be captured by a webcam 532, transmitted via a video channel (or a control channel) of the WebRTC session to the application delivery system 610, and then converted to control (or text) commands by command conversion functions (e.g., image processing logic to detect specific visual gestures by a user on a received video) within control processing 620. These converted audible inputs or visual gestures from a user of the client/mobile device (user input signals) may then be provided to the application running in the application environment.

The apparatus of claim 1, wherein the video conferencing session comprises at least a first video channel and a first audio channel for streaming of video data and audio data, respectively, from the first video conferencing endpoint (e.g., 518) to the second video conferencing endpoint (e.g., 528), and a second video channel and a second audio channel for streaming of video data and audio data, respectively, from the second video conferencing endpoint to the first video conferencing endpoint. In an example implementation, the apparatus may further include computer instructions that cause the apparatus to: receive, by the application delivery system from the client device via at least one of the second video channel and the second audio channel of the video conferencing session, a user input signal. A variety of user input signals may be transmitted and/or received over an audio channel and/or a video channel of the video conferencing sessions, such as an audible input from a user of the client device, a visual gesture by the user, or other user input signal from the user.

According to another example implementation, the apparatus may further include computer instructions that cause the apparatus to: provide the user input signal to the application; and receive, by the video capture module provided on the application delivery system, changed or updated display data output by the application in response to the user input signal. According to an example implementation, the user input signals may be provided or input to the application at the application delivery system 610, where such user input signals may cause the application to change or adjust the display data and audio data output by the application, which may result in a change or update to the display data and/or audio data output by the application, which in turn, may result in an update or change to the video frames output by the virtual webcam 616 and/or the audio data output by the virtual microphone 614 for streaming back to the client/mobile device via the video conference (e.g., WebRTC) session.

According to another example implementation, the computer instructions that cause the apparatus to receive, by the application delivery system from the client device, a user input signal may include instructions that cause the apparatus to: receive, by the first video conferencing endpoint from the second video conferencing endpoint via the video conferencing session, a user input signal indicating an audible input or a visual gesture by a user of the client device; and convert the user input signal indicating the audible input or the visual gesture to a control signal for the application; provide the control signal to the application; and receive, by the video capture module provided on the application delivery system, changed or updated display data output by the application in response to the control signal. For example, a user of a client/mobile device may generate audible inputs that may received/captured by microphone 534, transmitted via an audio (or control) channel of the WebRTC session to the application delivery system 610, and then converted by control processing 620 to control (or text) commands via speech-to-text functions, or other command conversion functions. In another example, a user of a client/mobile device may generate a visual gesture that may be captured by a webcam 532, transmitted via a video channel (or a control channel) of the WebRTC session to the application delivery system 610, and then converted to control (or text) commands by command conversion functions within control processing 620. These converted audible inputs or visual gestures from a user of the client/mobile device (user input signals) may then be provided to the application running in the application environment (e.g., see FIG. 6). These user input signals may cause the application to change or adjust the display data and audio data output by the application, which may result in a change or update to the display data and/or audio data output by the application, which in turn, may result in an update or change to the video frames output by the virtual webcam 616 and/or the audio data output by the virtual microphone 614 for streaming back to the client/mobile device via the video conference (e.g., WebRTC) session.

According to an example implementation, the computer instructions that cause the apparatus to stream may include computer instructions that cause the apparatus to stream the plurality of video frames received via the video capture module from the first video conferencing endpoint to the second video conferencing endpoint via the video conferencing session without downloading the application to the client device.

According to an example implementation, the computer instructions that cause the apparatus to establish may include computer instructions that cause the apparatus to: perform the following in response to a request from a client device to use without purchasing or downloading the application: invoke the application; and establish, by an application delivery system, a video conferencing session between a first video conferencing endpoint provided on the application delivery system and a second video conferencing endpoint provided on the client device.

According to an example implementation, the application is not present on the client device, and wherein the computer instructions that cause the apparatus to receive, by the application delivery system from the client device, a user input signal may include instructions that cause the apparatus to: receive, by the first video conferencing endpoint from the second video conferencing endpoint via a video channel of the video conferencing session, a user input signal; and changing, by the application, the display data output by the application based on the user input signal. In an example implementation, the user input signal may include a visual gesture from a user of the client device, e.g., which may be received by a client device webcam 532, wherein the visual gesture may be recorded or indicated on one or more video frames transmitted or streamed by video conferencing endpoint 528 over the video channel of the video conferencing session to the video conferencing endpoint 518 of application delivery system 610, where the application may change or update its audio data or display data output by the application based on the visual gesture. In some example implementations, the visual gesture may be converted by application delivery system 610 to a control signal that is provided or input to the application, e.g., to control the application, such as to cause the application to change or update its audio data or display data output by the application based on or in response to the control signal.

According to another example implementation, the application is not present on the client device, and wherein the computer instructions that cause the apparatus to receive, by the application delivery system from the client device, a user input signal may include instructions that cause the apparatus to: receive, by the first video conferencing endpoint from the second video conferencing endpoint via an audio channel of the video conferencing session, a user input signal; and changing, by the application, at least one of the display data or audio data output by the application based on the user input signal. In an example implementation, the user input signal may include an audible input from a user of the client device, e.g., which may be received by a client device microphone 534, wherein the audible input may be recorded or indicated on audio data transmitted or streamed by video conferencing endpoint 528 over the audio channel of the video conferencing session to the video conferencing endpoint 518 of application delivery system 610, where the application may change or update its audio data or display data output by the application based on the audible input. In some example implementations, the audible input may be converted by application delivery system 610 to a control signal that is provided or input to the application, e.g., to control the application, such as to cause the application to change or update its audio data or display data output by the application based on or in response to the control signal.

According to an example implementation, the application may be configured to run on an application environment different than an application environment provided by the client device. For example, the application (e.g., running on the application delivery system 610) may be configured to run on a non-mobile application environment, while the client may be a mobile device. As another example, the application may be configured to run on a first mobile operating system environment (e.g., iOS), while the mobile device that receives the audio/video content from the application via the video conferencing session may be a mobile device that runs a second mobile operating system (e.g., Android). The use of a video conferencing technology may allow content from an application configured to run in a first application environment to be streamed to a client device for display or output on the client device that is configured to operate applications in second application environment that is incompatible with the first application environment.

Similarly, the use of this video conferencing technology to stream application content may allow a user of a client device to send a request to use (e.g., view, receive or interact with) the application without purchasing or downloading the application, e.g., try-before-purchase, of the application. For example, a user of a mobile/client device may select a URL for an application (e.g., a video game, a weather application or other application), and the user may select an option to temporarily use without purchasing or downloading the application, e.g., try-before-buy, of the application (e.g., without the application being present on the client device). The application delivery system 610 may then invoke the application, establish the video conferencing session, select the virtual webcam 616 and virtual microphone 614 as inputs to the video conferencing endpoint 518 so as to stream the audio/display (video) content of the application to the mobile device. In this manner, the user may be able to receive the content of the application without having the visit the App store, and download/purchase the application, according to an illustrative example implementation.

Figure 10:
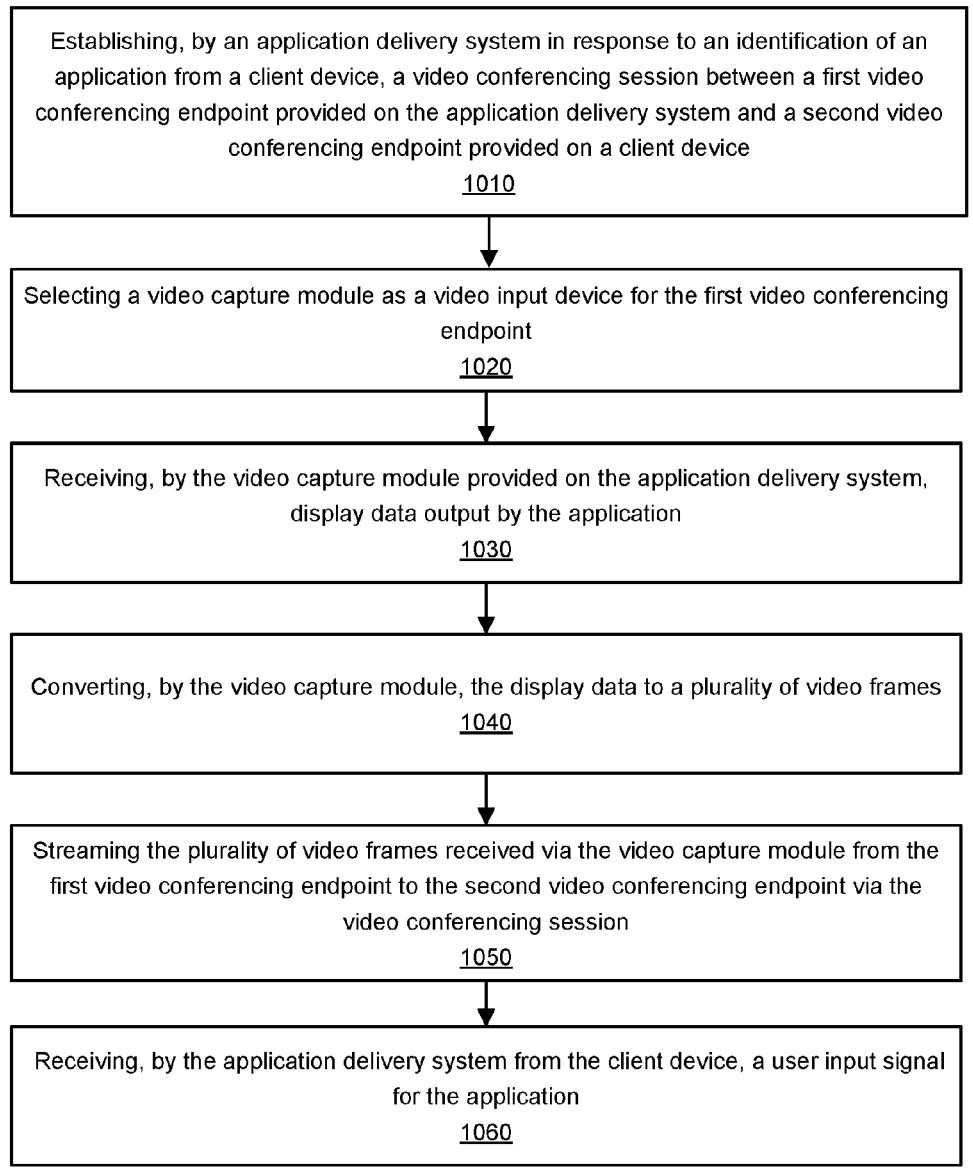
FIG. 10 is a flow chart illustrating a process for delivery of application content over a video conferencing session to a client device according to an example implementation.

FIG. 10 is a flow chart illustrating a process for delivery of application content over a video conferencing session to a client device according to an example implementation. Operation 1010 includes establishing, by an application delivery system in response to an identification of an application from a client device, a video conferencing session between a first video conferencing endpoint provided on the application delivery system and a second video conferencing endpoint provided on a client device. Operation 1020 includes selecting a video capture module as a video input device for the first video conferencing endpoint. Operation 1030 includes receiving, by the video capture module provided on the application delivery system, display data output by the application. Operation 1040 includes converting, by the video capture module, the display data to a plurality of video frames. Operation 1050 includes streaming the plurality of video frames received via the video capture module from the first video conferencing endpoint to the second video conferencing endpoint via the video conferencing session. And, operation 1060 includes receiving, by the application delivery system from the client device, a user input signal for the application.

According to an example implementation, the method may further include selecting an audio capture module as an audio input device for the first video conferencing endpoint; receiving, by the audio capture module provided on the application delivery system, audio data output by the application; and, streaming the audio data received via the audio capture module from the first video conferencing endpoint to the second video conferencing endpoint via the video conferencing session.

According to an example implementation, the receiving, by the audio capture module, may include: receiving, by the audio capture module, audio data output by the application in a first audio format associated with the application; converting, by the audio capture module, the audio data output by the application from the first audio format to a second audio format that is associated with at least the first video conferencing endpoint; and outputting the audio data in the second audio format to the first video conferencing endpoint.

According to an example implementation, the receiving, by the application delivery system from the client device, a user input signal for the application may include: establishing a control channel between the application delivery system and the client device; and receiving, by the application delivery system from the client device via the control channel, the user input signal for the application.

According to an example implementation, the receiving, by the application delivery system from the client device, a user input signal for the application may include: receiving, by the application delivery system from the client device via the video conferencing session, a user input signal from a user of the client device, the user input signal provided as at least one of: a first signal indicating a visual gesture by the user that is streamed by the second video conferencing endpoint to the first video conferencing endpoint via a video channel of the video conferencing session; and a second signal indicating an audible input by the user that is streamed by the second video conferencing endpoint to the first video conferencing endpoint via an audio channel of the video conferencing session.

According to an example implementation, the receiving, by the application delivery system from the client device, a user input signal for the application may include: receiving, by the application delivery system from the client device via at least one of a video channel and an audio channel of the video conferencing session, a user input signal.

According to an example implementation, the method may further include providing the user input signal to the application; and receiving, by the video capture module provided on the application delivery system, changed or updated display data output by the application in response to the user input signal.

According to an example implementation, the receiving, by the application delivery system from the client device, a user input signal for the application may include: receiving, by the first video conferencing endpoint from the second video conferencing endpoint via the video conferencing session, a user input signal indicating an audible input or a visual gesture by a user of the client device; converting the user input signal indicating the audible input or the visual gesture to a control signal for the application; providing the control signal to the application; and receiving, by the video capture module provided on the application delivery system, changed or updated display data output by the application in response to the control signal.

According to an example implementation, the streaming may include: streaming the plurality of video frames received via the video capture module from the first video conferencing endpoint to the second video conferencing endpoint via the video conferencing session without downloading the application to the client device.

According to an example implementation, the establishing may include performing the following in response to a request from a client device to use without purchasing or downloading the application: invoking the application; and establishing, by an application delivery system, a video conferencing session between a first video conferencing endpoint provided on the application delivery system and a second video conferencing endpoint provided on the client device.

According to an example implementation, the application may be configured to run on an application environment different than an application environment provided by the client device.

According to an example implementation, a computer program product may include a non-transitory computer-readable storage medium and storing executable code that, when executed by at least one data processing apparatus, is configured to cause the at least one data processing apparatus to perform a method including: establishing, by an application delivery system in response to an identification of an application from a client device, a video conferencing session between a first video conferencing endpoint provided on the application delivery system and a second video conferencing endpoint provided on a client device; selecting a video capture module as a video input device for the first video conferencing endpoint; receiving, by the video capture module provided on the application delivery system, display data output by the application; converting, by the video capture module, the display data to a plurality of video frames; streaming the plurality of video frames received via the video capture module from the first video conferencing endpoint to the second video conferencing endpoint via the video conferencing session; and receiving, by the application delivery system from the client device, a user input signal for the application.

According to an example implementation of the computer program product, the receiving, by the application delivery system from the client device, a user input signal for the application may include: establishing a control channel between the application delivery system and the client device; and receiving, by the application delivery system from the client device via the control channel, the user input signal for the application.

According to an example implementation of the computer program product, the receiving, by the application delivery system from the client device, a user input signal for the application may include: receiving, by the application delivery system from the client device via at least one of a video channel and an audio channel of the video conferencing session, a user input signal.

Figure 11:
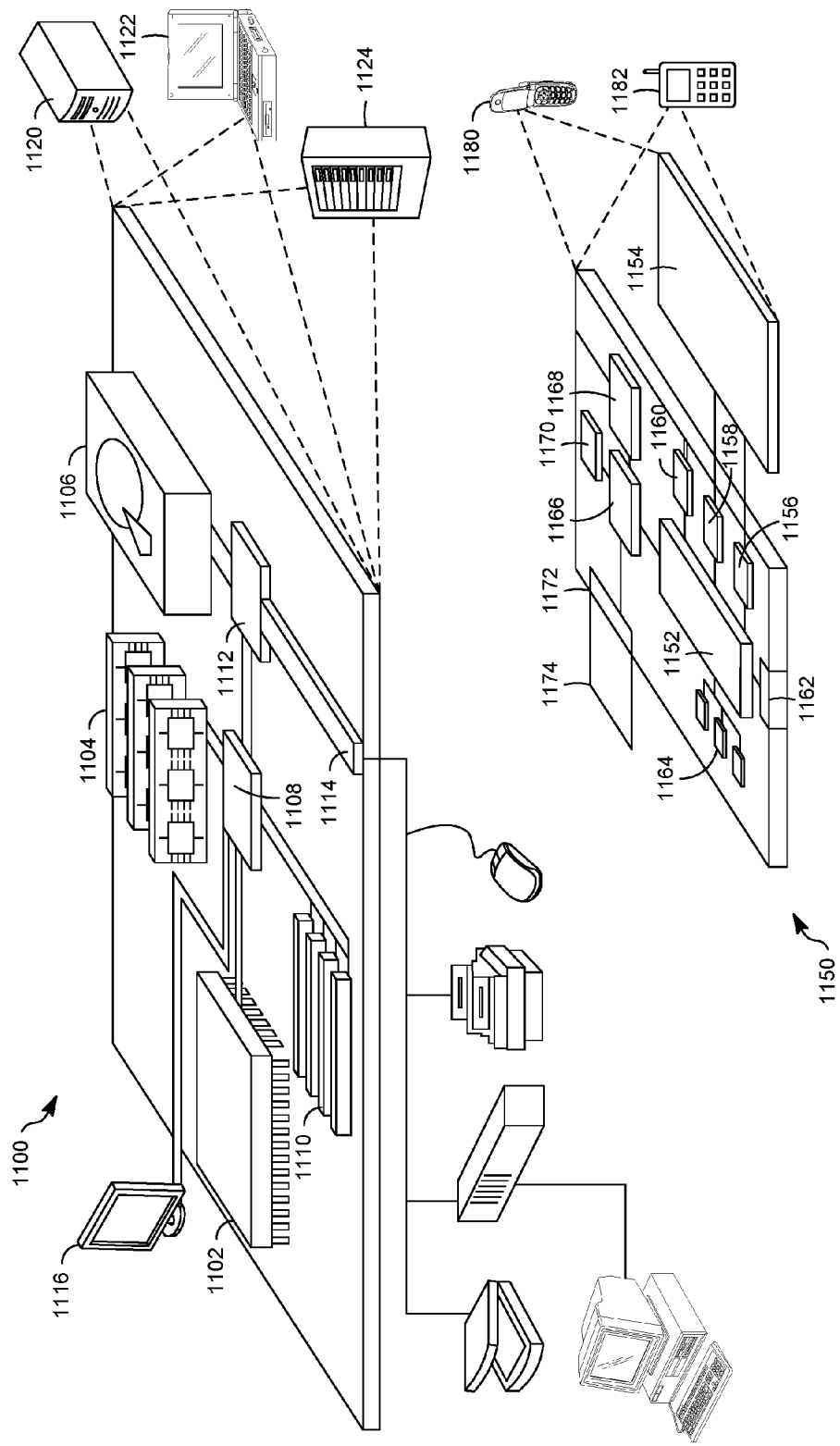
FIG. 11 shows an example of a generic computer device 1100 and a generic mobile computer device 1150, which may be used with the techniques described here.

FIG. 11 shows an example of a generic computer device 1100 and a generic mobile computer device 1150, which may be used with the techniques described here. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provided in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 966, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, Wi-Fi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An apparatus comprising at least one processor and at least one memory including computer instructions, when executed by the at least one processor, cause the apparatus to:
   establish, by an application delivery system in response to an identification of an application from a client device, a video conferencing session between a first video conferencing endpoint provided on the application delivery system and a second video conferencing endpoint provided on the client device;
   select, by the application delivery system, a video capture module as a video input device for the first video conferencing endpoint;
   receive, by the video capture module provided on the application delivery system, display data output by the application;
   convert, by the video capture module, the display data to a plurality of video frames;
   stream the plurality of video frames received via the video capture module from the first video conferencing endpoint to the second video conferencing endpoint via the video conferencing session; and
   receive, by the application delivery system from the client device, a user input signal for the application.

2. The apparatus of claim 1, wherein the video capture module comprises a virtual webcam that is configured to interface between the application and the first video conferencing endpoint and to output a plurality of video display frames in a format that is compatible with the first video conferencing endpoint.

3. The apparatus of claim 1, wherein the computer instructions that cause the apparatus to receive the display data comprises computer instructions that cause the apparatus to:
   receive, by the video capture module, one or more display frames output by the application; and
   buffer, by the video capture module, each of the one or more display frames.

4. The apparatus of claim 1, wherein the computer instructions that cause the apparatus to convert the display data comprises computer instructions that further cause the apparatus to:
   convert, by the video capture module, the display data from a first frame format to a plurality of video frames having a second frame format.

5. The apparatus of claim 1 and further comprising instructions that cause the apparatus to:
   select an audio capture module as an audio input device for the first video conferencing endpoint;
   receive, by the audio capture module provided on the application delivery system, audio data output by the application; and
   stream the audio data received via the audio capture module from the first video conferencing endpoint to the second video conferencing endpoint via the video conferencing session.

6. The apparatus of claim 5, wherein the audio capture module comprises a virtual microphone that is configured to interface between the application and the first video conferencing endpoint and to output audio data in a format that is compatible with at least the first video conferencing endpoint.

7. The apparatus of claim 5, wherein the computer instructions that cause the apparatus to receive, by the audio capture module, comprises computer instructions that cause the apparatus to:
   receive, by the audio capture module, audio data output by the application in a first audio format associated with the application;
   convert, by the audio capture module, the audio data output by the application from the first audio format to a second audio format that is associated with at least the first video conferencing endpoint; and
   output the audio data in the second audio format to the first video conferencing endpoint.

8. The apparatus of claim 1 and further comprising computer instructions that cause the apparatus to:
   establish a control channel between the application delivery system and the client device; and
   receive, by the application delivery system from the client device via the control channel, the user input signal for the application.

9. The apparatus of claim 1, wherein the computer instructions that cause the apparatus to receive, by the application delivery system from the client device, the user input signal comprise instructions that cause the apparatus to:
   receive, by the application delivery system from the client device via the video conferencing session, a user input signal from a user of the client device, the user input signal provided as at least one of:
   a first signal indicating a visual gesture by the user that is streamed by the second video conferencing endpoint to the first video conferencing endpoint via a video channel of the video conferencing session; and
a second signal indicating an audible input by the user that is streamed by the second video conferencing endpoint to the first video conferencing endpoint via an audio channel of the video conferencing session.

10. The apparatus of claim 1, wherein the video conferencing session comprises at least a first video channel and a first audio channel for streaming of video data and audio data, respectively, from the first video conferencing endpoint to the second video conferencing endpoint, and a second video channel and a second audio channel for streaming of video data and audio data, respectively, from the second video conferencing endpoint to the first video conferencing endpoint, the apparatus further comprising computer instructions that cause the apparatus to:
receive the user input signal via at least one of the second video channel and the second audio channel of the video conferencing session.

11. The apparatus of claim 1 and further comprising computer instructions that cause the apparatus to:
provide the user input signal to the application; and
receive, by the video capture module provided on the application delivery system, changed or updated display data output by the application in response to the user input signal.

12. The apparatus of claim 1, wherein the computer instructions that cause the apparatus to receive, by the application delivery system from the client device, a user input signal comprise instructions that cause the apparatus to:
receive, by the first video conferencing endpoint from the second video conferencing endpoint via the video conferencing session, a user input signal indicating an audible input or a visual gesture by a user of the client device; and
convert the user input signal indicating the audible input or the visual gesture to a control signal for the application; and
provide the control signal to the application to control the application; and
receive, by the video capture module provided on the application delivery system, changed or updated display data output by the application in response to the control signal.

13. The apparatus of claim 1, wherein the application is not present on the client device, and wherein the computer instructions that cause the apparatus to receive, by the application delivery system from the client device, a user input signal comprise instructions that cause the apparatus to:
receive, by the first video conferencing endpoint from the second video conferencing endpoint via a video channel of the video conferencing session, a user input signal; and
changing, by the application, the display data output by the application based on the user input signal.

14. The apparatus of claim 13 wherein the user input signal comprises a visual gesture from a user of the client device.

15. The apparatus of claim 5, wherein the application is not present on the client device, and wherein the computer instructions that cause the apparatus to receive, by the application delivery system from the client device, a user input signal comprise instructions that cause the apparatus to:
receive, by the first video conferencing endpoint from the second video conferencing endpoint via an audio channel of the video conferencing session, a user input signal; and
changing, by the application, at least one of the display data or audio data output by the application based on the user input signal.

16. The apparatus of claim 15 wherein the user input signal comprises an audible input from a user of the client device.

17. The apparatus of claim 1 wherein the first video conferencing endpoint comprises a first Web Real-Time Communications (WebRTC) endpoint provided on the application delivery system, and the second video conferencing endpoint comprises a second WebRTC endpoint provided on the client device.

18. The apparatus of claim 1 wherein the computer instructions that cause the apparatus to stream comprises computer instructions that cause the apparatus to:
stream the plurality of video frames received via the video capture module from the first video conferencing endpoint to the second video conferencing endpoint via the video conferencing session without downloading the application to the client device, and without the application being present on the client device.

19. The apparatus of claim 1 wherein the computer instructions that cause the apparatus to establish the video conferencing session comprises computer instructions that cause the apparatus to:
perform the following in response to a request from a client device to use without purchasing or downloading the application:
invoke the application; and
establish, by an application delivery system, a video conferencing session between a first video conferencing endpoint provided on the application delivery system and a second video conferencing endpoint provided on the client device.

20. The apparatus of claim 1 wherein the application is configured to run on an application environment different than an application environment provided by the client device.

21. A computer-implemented method for executing instructions stored on a non-transitory computer-readable storage medium, the method comprising:
establishing, by an application delivery system in response to an identification of an application from a client device, a video conferencing session between a first video conferencing endpoint provided on the application delivery system and a second video conferencing endpoint provided on the client device;
selecting, by the application delivery system, a video capture module as a video input device for the first video conferencing endpoint;
receiving, by the video capture module provided on the application delivery system, display data output by the application;
converting, by the video capture module, the display data to a plurality of video frames;
streaming the plurality of video frames received via the video capture module from the first video conferencing endpoint to the second video conferencing endpoint via the video conferencing session; and
receiving, by the application delivery system from the client device, a user input signal for the application.

22. The method of claim 21 and further comprising:
selecting an audio capture module as an audio input device for the first video conferencing endpoint;
receiving, by the audio capture module provided on the application delivery system, audio data output by the application; and
streaming the audio data received via the audio capture module from the first video conferencing endpoint to the second video conferencing endpoint via the video conferencing session.

23. A computer program product, the computer program product comprising a non-transitory computer-readable storage medium and storing executable code that, when executed by at least one data processing apparatus, is configured to cause the at least one data processing apparatus to perform a method comprising: establishing, by an application delivery system in response to an identification of an application from a client device, a video conferencing session between a first video conferencing endpoint provided on the application delivery system and a second video conferencing endpoint provided on the client device;
Selecting, by the application delivery system, a video capture module as a video input device for the first video conferencing endpoint;
receiving, by the video capture module provided on the application delivery system, display data output by the application;
converting, by the video capture module, the display data to a plurality of video frames;
streaming the plurality of video frames received via the video capture module from the first video conferencing endpoint to the second video conferencing endpoint via the video conferencing session; and
receiving, by the application delivery system from the client device, a user input signal for the application.

24. The computer program product of claim 23 wherein the receiving, by the application delivery system from the client device, a user input signal for the application comprises:
establishing a control channel between the application delivery system and the client device; and
receiving, by the application delivery system from the client device via the control channel, the user input signal for the application.

25. The computer program product of claim 23 wherein receiving, by the application delivery system from the client device, the user input signal for the application comprises:
receiving the user input signal via at least one of a video channel and an audio channel of the video conferencing session.

* * * * *